US012762256B2

(12) United States Patent
Smith et al.

(10) Patent No.: US 12,762,256 B2
(45) Date of Patent: *Oct. 13, 2026

(54) SYSTEM AND METHODS FOR USING CIPHER OBJECTS TO PROTECT DATA

(71) Applicant: SERTAINTY CORPORATION, Nashville, TN (US)

(72) Inventors: Gregory Scott Smith, Madison, TN (US); Melani Leigh Smith Weed, Franklin, TN (US); Behzad Nadji, Tiburon, CA (US)

(73) Assignee: Sertainty Corporation, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,293

(22) Filed: Mar. 28, 2024

(65) Prior Publication Data

US 2024/0241972 A1 Jul. 18, 2024

Related U.S. Application Data

(63) Continuation of application No. 17/374,781, filed on Jul. 13, 2021, now Pat. No. 12,008,117, which is a (Continued)

(51) Int. Cl.

| | |
|---|---|
| ***G06F 21/60*** | (2013.01) |
| ***H04L 9/40*** | (2022.01) |
| ***H04W 4/18*** | (2009.01) |

(52) U.S. Cl.

CPC .......... *G06F 21/604* (2013.01); *G06F 21/606* (2013.01); *H04L 63/104* (2013.01);

(Continued)

(58) Field of Classification Search

CPC ................ G06F 21/604; G06F 21/606; G06F 2221/2107; G06F 2221/2141;

(Continued)

(56) References Cited

U.S. PATENT DOCUMENTS

| | | | |
|---|---|---|---|
| 5,276,444 | A | 1/1994 | McNair |
| 5,382,983 | A | 1/1995 | Kwoh et al. |

(Continued)

FOREIGN PATENT DOCUMENTS

| | | | |
|---|---|---|---|
| CA | 2167543 | A1 | 7/1997 |
| CA | 2217825 | A1 | 4/1998 |

(Continued)

OTHER PUBLICATIONS

Ajluni, C., "Security Techniques Ensure Privacy," Electronic Design, Apr. 1995, pp. 83-84 (abstract).

(Continued)

*Primary Examiner* — Aravind K Moorthy

(74) *Attorney, Agent, or Firm* — Goodwin Procter LLP

(57) ABSTRACT

Systems, methods, and devices configured to build and utilize an intelligent cipher transfer object are provided. The intelligent cipher transfer object includes a set of participants protected by cloaking patterns. A portable dynamic rule set, which includes executable code for managing access to the protected set of participants, is included within the intelligent cipher transfer object. For a given user, the intelligent cipher transfer object may provide access to some of the participants while preventing access to other participants, based on the portable dynamic rule set therein.

20 Claims, 13 Drawing Sheets

Related U.S. Application Data continuation of application No. 16/657,412, filed on Oct. 18, 2019, now Pat. No. 11,093,623, which is a continuation of application No. 15/704,735, filed on Sep. 14, 2017, now Pat. No. 10,482,266, which is a continuation of application No. 14/689,668, filed on Apr. 17, 2015, now Pat. No. 9,792,451, which is a continuation-in-part of application No. 13/710,366, filed on Dec. 10, 2012, now abandoned.

(60) Provisional application No. 61/980,617, filed on Apr. 17, 2014, provisional application No. 61/569,162, filed on Dec. 9, 2011.

(52) U.S. Cl.
CPC ............. *H04L 63/20* (2013.01); *H04W 4/185* (2013.01); *G06F 2221/2107* (2013.01); *G06F 2221/2141* (2013.01); *H04L 63/0428* (2013.01)

(58) Field of Classification Search
CPC ... H04L 63/104; H04L 63/20; H04L 63/0428; H04W 4/185
See application file for complete search history.

(56) References Cited

U.S. PATENT DOCUMENTS 5,475,819 A 12/1995 Miller et al.
5,557,518 A 9/1996 Rosen
5,610,980 A 3/1997 Johnson et al.
5,671,279 A 9/1997 Elgamal
5,677,955 A 10/1997 Doggett et al.
5,680,452 A * 10/1997 Shanton .............. G06F 12/1408 340/5.74
5,715,314 A 2/1998 Payne et al.
5,724,424 A 3/1998 Gifford
5,729,594 A 3/1998 Klingman
5,732,400 A 3/1998 Mandler et al.
5,737,414 A 4/1998 Walker et al.
5,765,144 A 6/1998 Larche et al.
5,768,382 A 6/1998 Schneier et al.
5,779,549 A 7/1998 Walker et al.
5,790,677 A 8/1998 Fox et al.
5,794,207 A 8/1998 Walker et al.
5,797,127 A 8/1998 Walker et al.
5,798,508 A 8/1998 Walker et al.
5,799,285 A 8/1998 Klingman
5,818,933 A 10/1998 Kambe et al.
5,822,737 A 10/1998 Ogram
5,855,008 A 12/1998 Goldhaber et al.
5,864,610 A 1/1999 Ronen
5,870,473 A 2/1999 Boesch et al.
5,878,403 A 3/1999 DeFrancesco et al.
5,883,810 A 3/1999 Franklin et al.
5,883,955 A 3/1999 Ronning
5,890,137 A 3/1999 Koreeda
5,892,900 A 4/1999 Ginter et al.
5,899,980 A 5/1999 Wilf et al.
5,901,228 A 5/1999 Crawford
5,903,721 A 5/1999 Sixtus
5,903,882 A 5/1999 Asay et al.
5,905,736 A 5/1999 Ronen et al.
5,909,492 A 6/1999 Payne et al.
5,909,671 A 6/1999 Byford et al.
5,914,472 A 6/1999 Foladare et al.
5,930,776 A 7/1999 Dykstra et al.
5,933,625 A 8/1999 Sugiyama
5,950,172 A 9/1999 Klingman
5,963,625 A 10/1999 Kawecki et al.
5,978,775 A 11/1999 Chen
5,991,738 A 11/1999 Ogram
5,996,076 A 11/1999 Rowney et al.
6,000,832 A 12/1999 Franklin et al.
6,002,767 A 12/1999 Kramer
6,003,765 A 12/1999 Okamoto
6,006,234 A * 12/1999 Govindarajan ....... G06F 16/244
6,023,499 A 2/2000 Mansey et al.
6,047,268 A 4/2000 Bartoli et al.
6,058,250 A 5/2000 Harwood et al.
6,058,258 A 5/2000 Cullum et al.
6,064,987 A 5/2000 Walker et al.
6,076,078 A 6/2000 Camp et al.
6,088,686 A 7/2000 Walker et al.
6,092,147 A 7/2000 Levy et al.
6,098,053 A 8/2000 Slater
6,112,983 A 9/2000 D'Anniballe et al.
6,113,495 A 9/2000 Walker et al.
6,119,105 A 9/2000 Williams
6,138,107 A 10/2000 Elgamal
6,158,657 A 12/2000 Hall, III et al.
6,161,133 A 12/2000 Kikinis
6,173,269 B1 1/2001 Solokl et al.
6,178,240 B1 1/2001 Walker et al.
6,209,091 B1 3/2001 Sudia et al.
6,233,341 B1 5/2001 Riggins
6,236,981 B1 5/2001 Hill
6,247,047 B1 6/2001 Wolff
6,249,865 B1 6/2001 Walker et al.
6,259,789 B1 * 7/2001 Paone .................. H04L 9/3247 713/189
6,263,447 B1 7/2001 French et al.
6,282,658 B2 8/2001 French et al.
6,286,034 B1 * 9/2001 Sato .......................... G06F 9/54 709/204
6,317,729 B1 11/2001 Camp et al.
6,321,339 B1 11/2001 French et al.
6,324,524 B1 11/2001 Lent et al.
6,327,578 B1 12/2001 Linehan
6,332,134 B1 12/2001 Foster
6,341,349 B1 1/2002 Takaragi et al.
6,373,950 B1 4/2002 Rowney
6,418,169 B1 7/2002 Datari
6,438,691 B1 8/2002 Mao
6,442,607 B1 8/2002 Korn et al.
6,446,052 B1 9/2002 Juels
6,460,076 B1 10/2002 Srinivasan
6,466,917 B1 10/2002 Goyal et al.
6,484,182 B1 11/2002 Dunphy et al.
6,490,567 B1 12/2002 Gregory
6,493,685 B1 12/2002 Ensel et al.
6,570,870 B1 5/2003 Berstis
6,581,060 B1 * 6/2003 Choy .................... G06F 16/284 707/999.009
6,584,309 B1 6/2003 Whigham
6,594,692 B1 7/2003 Reisman
6,622,169 B2 9/2003 Kikinis
6,629,150 B1 9/2003 Huded
6,650,633 B1 11/2003 Albers et al.
6,675,153 B1 1/2004 Cook et al.
6,721,716 B1 4/2004 Gross
6,763,464 B2 7/2004 Wang et al.
6,769,009 B1 7/2004 Reisman
6,771,317 B2 8/2004 Ellis et al.
6,792,537 B1 * 9/2004 Liu ......................... G06F 21/52 713/168
6,823,318 B1 11/2004 Creswell et al.
6,889,205 B1 5/2005 Lamm
6,957,334 B1 10/2005 Goldstein et al.
6,959,382 B1 10/2005 Kinnis et al.
6,961,858 B2 11/2005 Fransdonk
6,973,622 B1 12/2005 Rappaport et al.
6,978,366 B1 12/2005 Ignatchenko et al.
6,993,572 B2 1/2006 Ross, Jr. et al.
7,020,635 B2 3/2006 Hamilton et al.
7,024,395 B1 4/2006 McCown et al.
7,035,824 B2 4/2006 Nel
7,039,688 B2 5/2006 Matsuda et al.
7,039,806 B1 * 5/2006 Friedman ............. H04L 51/212 713/170
7,051,067 B1 * 5/2006 Liu ....................... G06F 21/602 709/227
7,051,072 B2 5/2006 Stewart et al.
7,072,856 B1 7/2006 Nachom

(56) References Cited

U.S. PATENT DOCUMENTS 7,076,458 B2 7/2006 Lawlor et al.
7,080,049 B2 7/2006 Truitt et al.
7,080,051 B1 7/2006 Crawford
7,090,128 B2 8/2006 Farley et al.
7,103,910 B1 * 9/2006 Liu ........................ H04L 9/3247 713/168
7,107,462 B2 9/2006 Fransdonk
7,110,978 B1 9/2006 Chin
7,134,131 B1 11/2006 Hendricks et al.
7,143,147 B1 11/2006 Hickman et al.
7,143,148 B1 11/2006 Hickman et al.
7,143,186 B2 11/2006 Stewart et al.
7,150,045 B2 12/2006 Koelle et al.
7,206,748 B1 4/2007 Gruse et al.
7,248,675 B2 7/2007 Mirashrafi et al.
7,249,097 B2 7/2007 Hutchison et al.
7,266,499 B2 9/2007 Surace et al.
7,340,045 B2 3/2008 Felger
7,356,503 B1 4/2008 Johnson et al.
7,380,120 B1 5/2008 Garcia
7,386,477 B2 6/2008 Fano
7,451,103 B1 11/2008 Boyle et al.
7,483,858 B2 1/2009 Foran et al.
7,487,535 B1 * 2/2009 Isaacson ............... H04L 9/3271 726/4
7,545,931 B2 6/2009 Dillaway
7,546,637 B1 * 6/2009 Agbabian ............... H04L 63/20 713/168
7,587,502 B2 9/2009 Crawford et al.
7,606,760 B2 10/2009 Hutchison et al.
7,620,565 B2 11/2009 Abelow
7,672,892 B2 3/2010 Odom et al.
7,681,046 B1 * 3/2010 Morgan .................. G06F 21/72 713/193
7,703,140 B2 4/2010 Nath et al.
7,711,586 B2 5/2010 Aggarwal et al.
7,765,151 B1 7/2010 Williams et al.
7,818,399 B1 10/2010 Ross, Jr. et al.
7,908,226 B2 3/2011 Hutchison et al.
7,917,130 B1 3/2011 Christensen et al.
7,921,288 B1 4/2011 Hildebrand
7,930,733 B1 * 4/2011 Iftode ................... G06F 21/575 713/168
8,001,039 B2 8/2011 Crosthwaite et al.
8,042,163 B1 * 10/2011 Karr ........................ G06F 3/062 726/8
8,078,527 B2 12/2011 Cerise et al.
8,127,345 B2 2/2012 Gregg et al.
8,130,768 B1 * 3/2012 Ahrens ................... H04L 65/80 370/352
8,185,830 B2 * 5/2012 Saha ..................... G06F 16/958 715/764
8,266,245 B1 * 9/2012 Saviano ................. G06Q 10/10 726/4
8,544,103 B2 * 9/2013 Nilsson ............... G06F 21/6245 726/28
8,584,211 B1 * 11/2013 Vetter ..................... G06F 21/00 726/28
8,600,998 B1 * 12/2013 Chaudhary ........... G06F 16/122 707/741
8,738,531 B1 5/2014 Kalyadin et al.
8,819,068 B1 * 8/2014 Knote ................. G06F 16/2282 707/790
8,839,451 B1 * 9/2014 Lam .................... G06F 21/1011 713/193
8,898,402 B1 * 11/2014 Stronge ................. G06F 3/0605 711/100
8,943,309 B1 * 1/2015 Schilder .............. H04L 63/0807 713/182
8,984,640 B1 * 3/2015 Emigh .................. H04L 51/212 726/13
9,058,504 B1 6/2015 Swanson et al.
9,083,720 B2 * 7/2015 Bonnes ................. G06F 21/604
9,313,187 B1 * 4/2016 Huntwork ........... H04L 63/0281
9,323,901 B1 * 4/2016 Nair ........................ G06F 21/10
9,330,275 B1 5/2016 Endresen et al.
9,338,092 B1 5/2016 Allen
9,602,538 B1 * 3/2017 Chou ...................... H04L 63/20
9,635,000 B1 4/2017 Muftic
9,690,968 B2 6/2017 Wadley
9,792,451 B2 * 10/2017 Smith ..................... H04L 63/20
9,792,593 B2 10/2017 Hayhow et al.
10,069,914 B1 9/2018 Smith
10,078,754 B1 9/2018 Brandwine et al.
10,482,266 B2 * 11/2019 Smith ................... H04L 63/104
10,581,737 B1 3/2020 Allen
10,616,255 B1 * 4/2020 Strauss ................... H04L 63/10
11,093,623 B2 * 8/2021 Smith ................... H04L 63/104
12,008,117 B2 * 6/2024 Smith ................... H04W 4/185
12,072,989 B2 8/2024 Smith et al.
2001/0000535 A1 4/2001 Lapsley et al.
2001/0001877 A1 5/2001 French et al.
2001/0007098 A1 7/2001 Hinrichs et al.
2001/0018739 A1 8/2001 Anderson et al.
2001/0037310 A1 11/2001 Saeki
2001/0039533 A1 11/2001 Pare et al.
2001/0039535 A1 11/2001 Tsiounis et al.
2001/0042051 A1 11/2001 Barrett et al.
2001/0042124 A1 11/2001 Barron
2002/0007343 A1 1/2002 Oyama et al.
2002/0013765 A1 1/2002 Shwartz
2002/0023051 A1 2/2002 Kunzle et al.
2002/0032873 A1 * 3/2002 Lordemann ............. G06F 21/10 726/28
2002/0035533 A1 3/2002 Mache et al.
2002/0046188 A1 4/2002 Burges et al.
2002/0059430 A1 5/2002 Orbke et al.
2002/0062249 A1 5/2002 Iannacci
2002/0064283 A1 * 5/2002 Parenty ................. H04L 9/0825 380/277
2002/0071556 A1 * 6/2002 Moskowitz ........ H04N 21/2347 348/E7.056
2002/0071564 A1 * 6/2002 Kurn ....................... H04L 63/08 380/281
2002/0078344 A1 6/2002 Sandhu et al.
2002/0111919 A1 8/2002 Weller et al.
2002/0116341 A1 8/2002 Hogan et al.
2002/0128969 A1 9/2002 Parmelee et al.
2002/0138722 A1 * 9/2002 Douceur ............... H04L 9/0825 713/153
2002/0141593 A1 * 10/2002 Kurn ....................... H04L 9/085 380/286
2002/0144120 A1 10/2002 Ramanathan
2002/0144262 A1 10/2002 Plotnick et al.
2002/0147838 A1 10/2002 Pisarsky
2002/0161719 A1 10/2002 Manning et al.
2002/0194209 A1 * 12/2002 Bolosky ................ G06F 16/137
2002/0194484 A1 * 12/2002 Bolosky .................. G06F 21/64 713/189
2003/0014362 A1 1/2003 Yim
2003/0033259 A1 2/2003 Walker et al.
2003/0037261 A1 * 2/2003 Meffert ............ H04N 21/44204 726/5
2003/0046223 A1 3/2003 Crawford et al.
2003/0046237 A1 3/2003 Uberti
2003/0051172 A1 * 3/2003 Lordemann ......... H04L 63/0428 726/5
2003/0101341 A1 * 5/2003 Kettler, III .......... G06F 21/6245 713/193
2003/0105859 A1 * 6/2003 Garnett ................... G06F 21/55 709/224
2003/0120928 A1 * 6/2003 Cato ................... H04L 63/0428 713/193
2003/0163423 A1 8/2003 Holst-Roness
2003/0171992 A1 9/2003 Blagg et al.
2003/0204718 A1 10/2003 Connelly et al.
2003/0236979 A1 * 12/2003 Himmel .................. H04L 63/08 713/167
2003/0236999 A1 * 12/2003 Brustoloni .......... H04L 63/0263 709/225

(56) References Cited

U.S. PATENT DOCUMENTS

2003/0237005 A1* 12/2003 Bar-Or .................... H04L 63/20 713/182
2004/0002878 A1 1/2004 Maria Hinton
2004/0003259 A1 1/2004 Chang
2004/0028227 A1* 2/2004 Yu ....................... H04L 63/0428 348/E7.056
2004/0034848 A1* 2/2004 Moore .................. G06N 5/047 717/110
2004/0064724 A1* 4/2004 Himmel ................ H04L 63/105 713/185
2004/0078394 A1 4/2004 Powell et al.
2004/0083184 A1 4/2004 Tsuei et al.
2004/0121723 A1 6/2004 Poltorak
2004/0123112 A1* 6/2004 Himmel .............. G06F 21/6209 713/182
2004/0141616 A1* 7/2004 Himmel .............. H04L 63/0442 380/270
2004/0168055 A1* 8/2004 Lord ..................... H04L 9/3247 713/156
2004/0176070 A1 9/2004 Lai et al.
2004/0192306 A1 9/2004 Elkarat et al.
2004/0193546 A1* 9/2004 Tokutani ................ G06Q 10/10 705/59
2004/0199456 A1 10/2004 Flint et al.
2004/0199782 A1* 10/2004 Arnold ................ G06F 21/6245 726/1
2004/0252836 A1* 12/2004 Yoshida ................ H04L 9/3242 380/268
2004/0267665 A1 12/2004 Nam et al.
2005/0039034 A1* 2/2005 Doyle ................... H04L 9/0825 713/193
2005/0060539 A1* 3/2005 Anspach ............. H04L 63/0428 713/160
2005/0094640 A1* 5/2005 Howe ................. H04L 47/2416 370/474
2005/0108519 A1* 5/2005 Barton .................. H04L 9/3263 713/155
2005/0160281 A1* 7/2005 Thibadeau ............ G06F 3/0622 713/189
2005/0177518 A1 8/2005 Brown
2005/0192896 A1 9/2005 Hutchison et al.
2005/0216421 A1 9/2005 Barry et al.
2005/0257069 A1* 11/2005 Tanaka .................. H04L 9/0618 713/189
2005/0278259 A1* 12/2005 Gunaseelan ........... G06Q 10/10 705/59
2006/0041748 A1* 2/2006 Lockhart ................ G06Q 30/06 713/168
2006/0089912 A1 4/2006 Spagna et al.
2006/0149913 A1 7/2006 Rothman et al.
2006/0168663 A1 7/2006 Viljoen et al.
2006/0195363 A1* 8/2006 Heron ................ G06Q 30/0601 705/26.1
2006/0224742 A1 10/2006 Shahbazi
2006/0230282 A1* 10/2006 Hausler ............... G06F 21/6218 713/182
2006/0237528 A1 10/2006 Bishop et al.
2006/0248330 A1 11/2006 Randle et al.
2006/0277594 A1* 12/2006 Chiavegatto ........... G06Q 10/10 726/1
2006/0280297 A1* 12/2006 Fukaya ................. H04L 9/0844 380/28
2006/0282681 A1 12/2006 Scheidt et al.
2007/0052517 A1 3/2007 Bishop et al.
2007/0081666 A1* 4/2007 Shima ................... H04L 67/125 380/30
2007/0100830 A1* 5/2007 Beedubail ............... G06F 16/23 707/999.009
2007/0169175 A1* 7/2007 Hall .................... H04L 63/0807 726/3
2007/0185814 A1* 8/2007 Boccon-Gibod ..... H04L 9/3242 705/51
2007/0195959 A1* 8/2007 Clarke ...................... H04L 9/12 380/278
2007/0204350 A1* 8/2007 Juszkiewicz ............ G06F 21/10 707/E17.101
2007/0220062 A1* 9/2007 Carberry ............. G06F 21/6227
2007/0226809 A1* 9/2007 Ellard ................. G06F 21/6227 726/30
2007/0250930 A1* 10/2007 Aziz ..................... H04L 63/145 726/24
2007/0271578 A1 11/2007 Thenthiruperai et al.
2007/0299684 A1 12/2007 Goodwin
2007/0299771 A1 12/2007 Brody et al.
2008/0010672 A1* 1/2008 Buffmire ............... H04W 12/08 726/4
2008/0022361 A1* 1/2008 Bharadwaj ............ H04L 9/0836 726/2
2008/0109369 A1* 5/2008 Su ...................... G06Q 30/0273 705/14.69
2008/0109868 A1* 5/2008 Waris ................ H04M 1/72448 726/1
2008/0109876 A1* 5/2008 Hitomi ................ G06F 21/6218 726/2
2008/0155652 A1 6/2008 DeBie
2008/0162707 A1* 7/2008 Beck ....................... H04L 69/28 709/229
2008/0178255 A1* 7/2008 Gaikovich ............ H04L 63/102 726/1
2008/0184336 A1* 7/2008 Sarukkai ............. G06F 21/6218 726/1
2008/0215897 A1 9/2008 Doyle et al.
2008/0301078 A1* 12/2008 Proctor .................. G06N 5/022 706/47
2008/0301803 A1* 12/2008 Ontaneda .............. G06F 21/604 726/17
2009/0013185 A1* 1/2009 Lim ........................ G06F 21/10 713/170
2009/0055901 A1* 2/2009 Kumar .................. G06F 21/604 726/4
2009/0063382 A1* 3/2009 Proctor .................. G06N 5/025 706/47
2009/0070533 A1* 3/2009 Elazary ............... H04L 67/5682 711/159
2009/0077618 A1 3/2009 Pearce et al.
2009/0132819 A1 5/2009 Lu et al.
2009/0182756 A1* 7/2009 Kang .................... G06F 16/217 707/999.102
2009/0210697 A1* 8/2009 Chen ..................... H04L 67/104 713/153
2009/0217352 A1* 8/2009 Shen ................... G06F 21/6218 707/999.1
2009/0249462 A1 10/2009 Chhabra
2009/0265610 A1* 10/2009 Leonard .................. G06F 9/451 715/234
2009/0276625 A1* 11/2009 Huang .................... H04L 9/088 713/168
2009/0287837 A1 11/2009 Felsher
2009/0307029 A1* 12/2009 Ramanathan .......... G06Q 10/00 705/50
2010/0023353 A1* 1/2010 Stoffiere ................. G06Q 10/10 715/764
2010/0042542 A1 2/2010 Rose et al.
2010/0067686 A1* 3/2010 Minematsu ........... H04L 9/0618 708/250
2010/0080410 A1* 4/2010 Deluca ................ G06F 21/6245 726/2
2010/0082991 A1* 4/2010 Baldwin ................. H04L 9/083 380/278
2010/0088237 A1 4/2010 Wankmueller
2010/0100972 A1* 4/2010 Lemieux ................. H04W 4/02 342/357.31
2010/0107220 A1* 4/2010 Nguyen .............. G06F 21/6236 726/3
2010/0138910 A1* 6/2010 Aldor .................. H04L 63/0236 726/14
2010/0174652 A1* 7/2010 Shear ............... G11B 20/00159 705/53

(56) References Cited

U.S. PATENT DOCUMENTS

2010/0205431 A1* 8/2010 Griffin .................... G06F 21/32 713/158
2010/0223186 A1 9/2010 Hogan et al.
2010/0228668 A1 9/2010 Hogan et al.
2010/0235396 A1* 9/2010 Chaurasia ........... G06F 21/6218 707/E17.032
2010/0241873 A1* 9/2010 Miyazawa ............. G06F 8/658 717/174
2010/0242083 A1* 9/2010 Begum ................. H04L 63/105 726/1
2010/0274910 A1* 10/2010 Ghanaie-Sichanie ........................ H04L 63/08 709/229
2010/0280954 A1* 11/2010 Khandelwal ............ H04L 63/08 713/168
2010/0299362 A1* 11/2010 Osmond ............. G06F 21/6218 707/E17.001
2010/0306610 A1* 12/2010 Komatsu ............... H04L 1/1642 714/E11.023
2010/0306842 A1 12/2010 Asano et al.
2010/0319067 A1* 12/2010 Mohanty ............... H04L 63/101 726/21
2011/0010454 A1* 1/2011 Anuff ...................... H04L 41/28 709/225
2011/0040967 A1 2/2011 Waller et al.
2011/0055920 A1 3/2011 Hariri
2011/0087526 A1 4/2011 Morgenstern et al.
2011/0107418 A1* 5/2011 Bhagwan .............. G06F 21/604 706/45
2011/0153671 A1* 6/2011 Taniguchi ............. G06F 21/604 707/786
2011/0162040 A1 6/2011 Stephens
2011/0173454 A1* 7/2011 Paley .................... H04L 9/0825 713/189
2011/0252480 A1 10/2011 Patawaran et al.
2011/0258233 A1* 10/2011 Unger ............... G06F 16/24539 707/783
2011/0289322 A1* 11/2011 Rasti ................... H04L 63/0421 713/182
2011/0293096 A1* 12/2011 Reilly ................... H04L 9/0833 380/277
2011/0314271 A1* 12/2011 Boccon-Gibod ..... H04L 9/0897 713/151
2011/0321120 A1* 12/2011 Saxena ............... G06F 21/6245 726/1
2012/0016999 A1* 1/2012 Kieselbach ........... G06F 16/289 709/229
2012/0030421 A1* 2/2012 Chang ................... G06F 13/126 711/108
2012/0079556 A1* 3/2012 Wahl ..................... G06F 21/604 726/1
2012/0084306 A1* 4/2012 Merritt .................... G06F 16/86 707/705
2012/0084341 A1* 4/2012 Mantri ................ G06F 16/2365 709/203
2012/0117533 A1* 5/2012 Hatcherson ............. G06F 30/20 703/22
2012/0142403 A1 6/2012 Prather et al.
2012/0151553 A1 6/2012 Burgess et al.
2012/0158667 A1* 6/2012 Raju ....................... G06F 16/84 707/756
2012/0173431 A1 7/2012 Ritchie et al.
2012/0197806 A1 8/2012 Hill
2012/0198559 A1* 8/2012 Venkata Naga Ravi .................... G06F 21/62 726/26
2012/0226656 A1* 9/2012 Bates ................ G06F 16/24564 707/600
2012/0239540 A1* 9/2012 Rogers, Jr. .......... G06F 21/6245 726/26
2012/0324094 A1 12/2012 Wyatt et al.
2013/0046720 A1* 2/2013 Chellappan .............. G06N 5/02 706/47
2013/0055161 A1* 2/2013 Adams .................. G06F 16/904 715/811
2013/0103584 A1 4/2013 Eichner et al.
2013/0104065 A1* 4/2013 Stecher ............... G06F 3/04842 715/767
2013/0142328 A1* 6/2013 Shibata ..................... H04L 9/16 380/28
2013/0152160 A1 6/2013 Smith et al.
2014/0026191 A1 1/2014 Jain et al.
2014/0090011 A1* 3/2014 Howe ................ H04L 47/2416 726/1
2014/0150060 A1 5/2014 Riley
2014/0157041 A1 6/2014 Danielsson et al.
2014/0201057 A1 7/2014 Shuster
2014/0245372 A1 8/2014 Elias et al.
2014/0258109 A1 9/2014 Jiang et al.
2015/0006392 A1 1/2015 Brand et al.
2015/0040180 A1 2/2015 Jacobson et al.
2015/0081567 A1 3/2015 Boyle et al.
2015/0089620 A1 3/2015 Manza et al.
2015/0121506 A1 4/2015 Cavanaugh
2015/0242825 A1 8/2015 Mills
2015/0288517 A1 10/2015 Evans et al.
2015/0294109 A1 10/2015 Kanzaki et al.
2015/0379259 A1 12/2015 Mohammed et al.
2016/0012240 A1 1/2016 Smith et al.
2016/0021224 A1* 1/2016 Howe ..................... H04L 63/02 370/474
2016/0173510 A1 6/2016 Harris et al.
2016/0267477 A1 9/2016 Mcdonald
2017/0063816 A1 3/2017 Ackerly
2017/0103459 A1 4/2017 Kim
2017/0132630 A1 5/2017 Castinado et al.
2017/0134765 A1 5/2017 Uhr et al.
2017/0149745 A1 5/2017 Geng
2017/0195330 A1 7/2017 Ren et al.
2018/0012000 A1 1/2018 Ogawa
2018/0097789 A1 4/2018 Murthy et al.
2018/0139219 A1* 5/2018 Sabata .................... H04L 41/06
2018/0145957 A1 5/2018 Kasibhatla et al.
2018/0351733 A1 12/2018 Rohel et al.
2018/0373887 A1 12/2018 Smith
2019/0058693 A1 2/2019 Alkhabbaz et al.
2019/0230090 A1 7/2019 Kathiara et al.
2020/0134158 A1 4/2020 Mullins et al.
2020/0162252 A1 5/2020 Davis et al.
2020/0177589 A1 6/2020 Mangalvedkar et al.
2020/0210568 A1 7/2020 Strogov et al.
2020/0294293 A1 9/2020 Boenig, II et al.
2021/0126774 A1 4/2021 Galligan et al.
2021/0194853 A1 6/2021 Xiao et al.
2021/0234700 A1 7/2021 Ali et al.
2022/0100825 A1* 3/2022 Groth ..................... G06N 20/10
2022/0329631 A1 10/2022 Chin et al.

FOREIGN PATENT DOCUMENTS

EP 0765068 A2 3/1997
EP 0 779 587 A2 6/1997
EP 0818907 A2 1/1998
EP 0883076 A2 12/1998
EP 0902381 A2 3/1999
EP 0 921 487 A2 6/1999
JP 9-91132 4/1997
JP 9-114787 5/1997
JP 9-114904 5/1997
JP 9-153964 6/1997
JP 9-179912 7/1997
JP 9-218903 8/1997
JP 9-259189 10/1997
JP 9-297789 11/1997
JP 9-305682 11/1997
JP 9-326002 12/1997
JP 10-3501 1/1998
JP 10-509543 9/1998
JP 10-327145 12/1998

(56) References Cited

FOREIGN PATENT DOCUMENTS

| | | | |
|---|---|---|---|
| JP | 11-3387 | | 1/1999 |
| JP | 11003387 | | 1/1999 |
| JP | 11-53444 | | 2/1999 |
| JP | 11-503541 | | 3/1999 |
| JP | 11-239128 | | 8/1999 |
| JP | 11-353280 | | 12/1999 |
| JP | 2001-350664 | A | 12/2001 |
| JP | 2002-353953 | A | 12/2002 |
| JP | 2005-056418 | A | 3/2005 |
| JP | 2009-252120 | A | 10/2009 |
| KR | 1020000012391 | | 3/2000 |
| KR | 10-2008-0064687 | A | 7/2008 |
| KR | 10-2008-0064787 | | 7/2008 |
| WO | WO-95/16971 | A1 | 6/1995 |
| WO | WO-96/21192 | A1 | 7/1996 |
| WO | WO-96/31965 | A1 | 10/1996 |
| WO | WO-96/37848 | A1 | 11/1996 |
| WO | WO-97/01920 | A1 | 1/1997 |
| WO | WO-9809260 | | 4/1997 |
| WO | WO-97/22074 | A1 | 6/1997 |
| WO | WO-97/29584 | A1 | 8/1997 |
| WO | WO-97/49054 | A2 | 12/1997 |
| WO | WO-98/40809 | A2 | 9/1998 |
| WO | WO-98/57460 | A1 | 12/1998 |
| WO | WO-99/21321 | A1 | 4/1999 |
| WO | WO-99/57835 | A1 | 11/1999 |

OTHER PUBLICATIONS

Alsop, S., "Bookmarks Mark the Next Chapter in the Continuing Story of the War of the Web," Info World 17(37):102, Sep. 11, 1995.

Benji Rogers: "How the Blockchain and VR Can Change the Music Industry—Cuepoint—Medium", Nov. 23, 2015 (Nov. 23, 2015), XP055374610, Retrieved from the Internet <URL:https://medium.com/cuepoint/bc-a-fair-trade-music-format-virtual-reality-the-blockchain-76fc47699733>.

Briefly Noted, Internet Business News, © 1994-8 M2 Communications Ltd., Coventry, United Kingdom, Jan. 1, 1998, p. 1.

Davenport, G, "New eCharge Internet Billing System Charges Purchases to Telephone Bill with AT&T MultiQuest", Business Wire, Dec. 3, 1997, 2 pages.

DigiBox: A Self-Protecting Container for Information Commerce, Olin Sibert, et al. 1995.

Electronic Commerce News, vol. 3, No. 42, Oct. 19, 1998, "Plastic or Cybercash? Cutting Banks out of the Payment Circuit," three pages.

Encryption Devices, Government Executive, Jul. 1996, p. 2A.

http://www.echarge.att.com/cgi-bin/Activate.cgi, "AT&T eCharge: Activate Your Account," available at least as early at Oct. 29, 1997.

http://www.echarge.att.com/cgi-bin/Register.cgi, "AT&T eCharge: Apply for an Account," available at least as early at Oct. 29, 1997.

http://www.echarge.att.com/cgi-bin/Transactions.cgi, "AT&T eCharge: Account Activity," available at least as early as Oct. 29, 1997.

http://www.echarge.att.com/faq.html, "AT&T eCharge: Frequently Asked Questions/Customer Support," available at least as early as Oct. 29, 1997.

http://www.echarge.att.com/how_wk .. html, "AT&T eCharge: How Does It Work?" available at least as early as Oct. 29, 1997.

http://www.echarge.att.com/indesx.html, "AT&T eCharge: Welcome to AT&T eCharge," available at least as early as Oct. 29, 1997.

http://www.echarge.att.com/terms_conditions.html, "AT&T eCharge: Frequently Asked Questions/Customer Support," available at least as early as Oct. 29, 1997.

Information Intelligence, Inc., "User Authentication and Authorization Challenges in a Networked Library Environment," Online Libraries & Microcomputers 15(10), Oct. 1, 1997.

International Preliminary Report on Patentability for International Application No. PCT/US2001/017106 dated Nov. 13, 2002.

International Preliminary Report on Patentability for International Application No. PCT/US2017/020640 dated Sep. 4, 2018.

International Search Report and Written Opinion for International Application No. PCT/US2017/020640 dated Sep. 8, 2017.

International Search Report and Written Opinion mailed Jan. 4, 2016, issued in corresponding International Application No. PCT/US2015/026405, filed Apr. 17, 2015, 6 pages.

International Search Report and Written Opinion mailed Mar. 22, 2013, issued in corresponding International Application No. PCT/US2012/068826, filed Dec. 10, 2012, 11 pages.

Internet Service Considers 900, Audiotex News, Jan. 1997, p. 8 (abstract).

Itoh, M., et al., "Outline of SET Protocol," NEC Journal 51 (9):90-99, 1998 (with partial English translation provided by foreign associate).

Lang, P., "Product Review: eCharge Billing System" © 1997-2009 Optimum Interactive LLC, Apr. 1998, <http:/fsellitontheweb.com/ezine/echarge.shtml> [retrieved Dec. 10, 2008], 3 pages.

Lau, H., "Open House: E-business and you: Buying on the Net . . . Safely," Businessworld (Philippines), Nov. 3, 1998.

Logicom, Inc., "New Web900 Service Offers Secure Billing Over the Internet," News Release, Jul. 1, 1996.

Marion, L., "Who's Guarding the Till at the Cybermall?" Datamation 41 (3):38-39, Feb. 15, 1995.

Minkoff, J., "Ensuring Online Security," Discount Merchandiser, Jan. 1996, p. 49.

Pappalardo, D., "Tools Lets ISPs Charge for Fax, Voice," Network World, Apr. 1997, p. 116.

PR Newsire Association, Inc., "Verisign Offers Unique Seal to Show Internet Users 'Proof of Authentication'," PR Newswire, Dec. 10, 1996.

Schneier, B., "Applied Cryptography: Protocols, Algorithms, and Source Code in C," 2nd Edition, John Wiley & Sons, Inc., New York, 1996 (rather than sending the entire text, applicants refer Examiner to the remarks regarding this reference that are contained in the European Examination Report identified in No. 3 above).

Sirbu, M.A., "Creating an Open Market for Information," Journal of Academic Librarianship, Nov. 1995, p. 467 (abstract).

Sweetland. P., "Integrated Billing and the Internet," Telecommunications 31(6):127-130, Jun. 1997.

Victims Seeking Cheap Online Erotica Aroused by Not-So-Cheap Phone Bills, San Jose Mercury News, Feb. 20, 1997, p. 1C.

Wasserman, T., "Retailers, OSPs Race to Secure Qnline Sales," Computer Retail Week 7(160):6-7, Jan. 6, 1997.

Wingfield, N., "Netscape Joins Fray with Web Browser for Windows 95," Info World 17(27):37, Jul. 3, 1995.

Yamamoto, H., "Development of Cyber Business by Integrating Internet Protocol Service with Telephone Service", The Telecommunications Association, NTT Technical Review 10(1):86-88, Jan. 1998.

Yamasaki, S., and K. Araki, "A Certificate Infrastructure Model for Integrated Cross-Authentification With Warranty and Use Policy Control," Trans. Information Processing Society of Japan 40(1 ):296-309, Jan. 1999 (English Abstract).

* cited by examiner

SYSTEM AND METHODS FOR USING CIPHER OBJECTS TO PROTECT DATA

This application is a continuation of and claims priority to U.S. application Ser. No. 17/374,781, filed Jul. 13, 2021 which is a continuation of and claims priority to U.S. application Ser. No. 16/657,412, filed Oct. 18, 2019 (now U.S. Pat. No. 11,093,623 issued on Aug. 17, 2021) which is a continuation of and claims priority to U.S. application Ser. No. 15/704,735, filed Sep. 14, 2017 (now U.S. Pat. No. 10,482,266 issued on Nov. 19, 2019) which is a continuation of and claims priority to U.S. application Ser. No. 14/689,668, filed Apr. 17, 2015 (now U.S. Pat. No. 9,792,451 issued on Oct. 17, 2017), which is a continuation-in-part application of U.S. application Ser. No. 13/710,366, filed Dec. 10, 2012, which claims priority to U.S. Provisional Application No. 61/569,162, filed Dec. 9, 2011, and is entitled to those filing dates for priority in whole or in part. U.S. application Ser. No. 14/689,668 also claims priority to U.S. Provisional Application No. 61/980,617, filed Apr. 17, 2014, and is entitled to that filing date for priority in whole or in part. The specifications, figures and complete disclosures of the aforementioned applications are incorporated herein by specific reference for all purposes.

FIELD OF INVENTION

This invention relates to a system and related methods for protecting and controlling data using self-encryption and self-governance, including, but not limited to, the use of an intelligent cipher transfer object.

BACKGROUND OF THE INVENTION

Current techniques for protecting data have certain drawbacks. When information is outside of a trusted environment, like a secure network, it is typically protected by encryption in large part because other security measures, such as network IAM and PAC applications, no longer govern use of the information. In current techniques, encryption keys must be present within an application, or revealed or traded by users or via an application, for encrypted data to be useful, thereby potentially compromising protection and confidentiality. Encryption keys can be stolen in a discovery or APT assault, or can be compromised via social engineering or other means. Further, once an encryption key (or password) is shared and the data unlocked, control of the data is lost. Even when data is within a trusted environment, such as behind a firewall or the like, it is vulnerable to attack or misuse, as files are available to anyone with access to their storage location. Protecting information traditionally requires teams of people with expertise in networks, BYOD, telecommunication, servers and applications, integrating them all and coordinating efforts on an enterprise scale to achieve a level of security which nevertheless can be compromised by exploiting flaws and gaps inherent in complex integrations.

Typical data encryption relies on algorithms that run in a predetermined sequence to encrypt and then run in the reverse sequence to decrypt. There may also be a process of moving pieces of data in a static pattern to cloak it, and then reversing the process to reveal the complete, unencrypted file. With this prior-art method, an attacker who understands the encryption algorithm used to encrypt data can break the encryption by reversing the encryption process.

Fully homomorphic encryption attempts to remove the trust aspect of a relationship, making trust between parties an irrelevant factor. For example, one party can send their data to an outsourcer for storage or processing without trusting what the outsourcer might do with it, as the outsourcer is only given access to an encrypted version of the data to perform processing that does not require decryption. However, fully homomorphic encryption is too cumbersome to be practical.

Another traditional technique for protecting data is the use of dynamic controls. Dynamic controls are application dependent, such as password protected PDF files generated and used by document viewing and editing software produced by Adobe®, or the like. Traditional dynamic controls are dependent on the application or reside within an application. Rules are executed by the application. While also dependent on a key (password) exchange as given above, another drawback to this method is that application-dependent rules may be overridden (as in the example of a protected PDF opened with Adobe® Acrobat®) or, a developer could write an application that ignores the rules imposed by the authoring application.

Accordingly, what is needed is a data assurance solution that is self-protecting and self-governing, that is less dependent on keys and passwords for authentication, on predictable reversible encryption sequences for protection, and on external applications for execution while remaining functional and efficient both within and outside the secure environment, both for data at rest and in transit.

SUMMARY OF INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In several exemplary embodiments, the present invention comprises a self-protecting, self-controlling intelligent cipher transfer object (ICTO), which may be stored on a computer-readable medium. The ICTO comprises a set of participants including a portable dynamic rule set (PDRS). The PDRS, in response to execution by one or more processors or microprocessors of a computing device, causes the computing device to perform actions, including, but not limited to, the following: receiving, from an agent, a request for access to a portion of a participant of the set of participants; verifying that the agent is authorized to access the requested participant portion; and providing access to the requested participant portion for the agent without providing access to other portions of the set of participants for the agent. A computer-implemented method of creating such an ICTO and a computing device configured to execute the executable portions of such an ICTO are also provided.

In one exemplary embodiment, the present invention comprises an ICTO-aware application, operating system, or device, including, but not limited to, computer chips, switches, controls panels, FGPAs, and the like, that activates the ICTO in response to a request for access. The ICTO comprises a set of participants including but not limited to owner data, and a PDRS. Upon activation of the dynamic participant controller (DPC) within the ICTO, remotely or locally, the PDRS within the ICTO takes and maintains control of the ICTO until the protected object is closed (i.e., inactive or asleep). The PDRS, responding to the agent access request, through the dynamic participant controller, to all or some of the participant data, verifies the agent is authentic and authorized to access all, some, or none of the protected data set. Upon verification, the agent can only access authorized portions of the protected data set while the remaining protected data within the ICTO remains inaccessible to the agent. A computer-implemented method of creating such an ICTO utilizing an ICTO-aware application, operating system or device to activate the executable portions of such an ICTO is also provided.

In a further embodiment, a computer-implemented method of protecting a set of participants is provided. A set of participants to be protected is obtained by a computing device. One or more cloaking patterns for protecting the set of participants are determined. A first cloaking pattern is used to protect or mix a first subset of the set of participants, and a second cloaking pattern different from the first cloaking pattern is used to protect or mix a second subset of the set of participants. The determined cloaking patterns are applied by the computing device to the set of participants to create a set of cloaked or mixed participants. The set of cloaked participants are added by the computing device to an ICTO. A computing device configured to perform this method and a computer-readable medium having computer-executable instructions stored thereon that, in response to execution by one or more processors of a computing device, cause the computing device to perform such a method are also provided.

In yet another embodiment, the present invention comprises an ICTO-aware application, operating system, or device that facilitates this method for protecting a set of participants. A set of participants is gathered through an ICTO-aware application, operating system, or device to create an interim pattern ICTO, which includes a set of participants and a temporary or "starter" rule set provided by the cipher engine or dynamic participant controller until the ICTO is fully implemented. The interim pattern ICTO is cloaked by one or more cloaking patterns dynamically selected or produced and applied by the dynamic participant controller. The temporary rule set is subsequently replaced with one or more specific or unique rule sets as defined by the owner, one or more cloaking patterns are dynamically and randomly selected or produced for each ICTO by the PDRS within the ICTO. Cloaking patterns may be applied randomly to all or some portion of the participants while additional cloaking patterns may be applied randomly to all or some portion of the participants to create a unique cloaked set of participants for each ICTO.

In another embodiment, a computing device configured to access data protected or governed by an ICTO is provided. An access request from an agent to access a portion of a participant stored or mixed in the ICTO is received by the computing device. A PDRS within the ICTO is activated by the computing device. At least one rule in the PDRS is executed by the computing device to evaluate the access request. In response to determining that the access request is permissible, access to the portion of the participant requested by the agent is provided without providing access to other participant portions.

In yet another embodiment, the present invention comprises an ICTO-aware application, operating system or device that activates the ICTO upon receiving an access request from an agent. The dynamic participant controller within the ICTO is activated, and upon activation the embedded PDRS takes and maintains control of the ICTO. At least one rule is of PDRS is executed to evaluate the authenticity and authorization of the agent to access all, some, or none of the protected data. If the agent is granted access to all or some of the protected data, the protected data not authorized for access remains protected and not visible to the accessing agent. The inactive ICTO is inaccessible without an ICTO-aware application, operating system or device.

BRIEF DESCRIPTION OF THE DRAWINGS

The foregoing aspects and many of the attendant advantages of embodiments of the present disclosure will become more readily appreciated as the same become better understood by reference to the following detailed description, when taken in conjunction with the accompanying drawings.

DETAILED DESCRIPTION OF EXEMPLARY EMBODIMENTS

Figure 1:
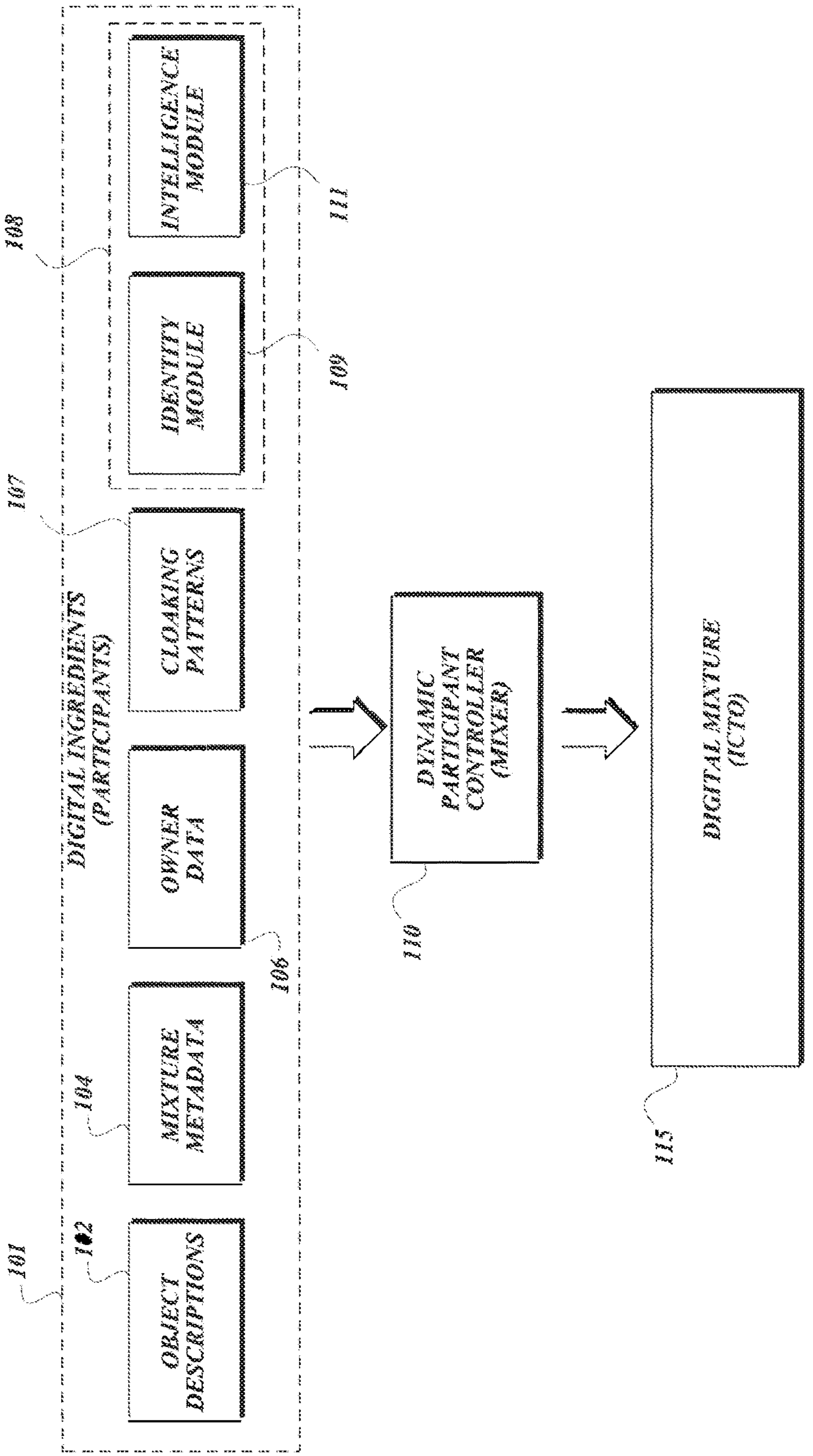
FIG. 1 shows a schematic diagram that illustrates an exemplary embodiment of data governance according to various aspects of the present invention.

In several exemplary embodiments, the present invention comprises a self-contained, self-protecting, self-controlling intelligent cipher transfer object (ICTO), which may be stored on a computer-readable medium. The ICTO comprises a set of participants including a portable dynamic rule set (PDRS). Computer-implemented methods of creating, accessing, and using such an ICTO, and a computing device configured to execute the executable portions of such an ICTO, also are provided.

In various embodiments, the present invention addresses critical faults with previous data protection systems and methods. The present invention fills a gap in existing protection schemes because existing schemes address perimeter defenses, user access (both users and their devices) and anomaly detection, but are not attached to the data itself. If prior-art encryption is utilized, the burden of key code management may reduce productivity or flaws may create yet other vulnerabilities by exposing keys that likewise need to be protected.

Embodiments of the present disclosure provide a self-contained, self-protecting, self-governing, data-centric solution, meaning that the controls for data management, protection, and administration are grafted into, and become part of, each data set and directly oversee the data set's access and use. Though, in some embodiments of the present disclosure, some data can be removed from protection for analysis or use by an authorized agent, the method of removal from protection is not predictable because it is not a reversal of the protection mechanism or mechanisms. The present invention comprises an unpredictable and irreversible system and associated methods to retain dynamic, portable, independent, persistent, intelligent governance of data over the life of the data's existence. This system is capable of protecting data while the data is stored or in transit, and in the hands of trusted data users or untrusted data users.

In some embodiments of the present disclosure, the data protection scheme is embedded within, grafted to, and maintained within the data-set. The data protection scheme may also create an audit trail of attempts to access the data. Known or authorized users of the data are noted in an embedded log, while unknown parties or other unauthorized attempts to access the data are likewise noted in the embedded log and can be transmitted and displayed to the data owner in real time. If an unauthorized party attempts to access the data, the self-protecting data can defend itself, take offensive action against the intrusion, alert the data owner to the unauthorized attempt, and/or take any other appropriate action.

The data owner utilizes the protection scheme as a simple and lightweight management tool that continuously validates the relationship of the parties to the data. From an attacker's point of view, the system is unpredictable because every authorized party has its established identity incorporated into the protection scheme. A unique protection scheme may be provided for each combination of owner, user, and dataset; this means that the method by which data is revealed to Authorized Party A would not be the way data is revealed to Authorized Party B.

Further, the unique protection scheme that may be provided for a combination of owner, user, data set and rule set will likewise be unique to itself when the same combination is protected subsequent times. That is, each time a combination of owner, user, data set and rule set is protected as described herein, whether it is the same combination or a different combination, the ICTO will be a uniquely protected ICTO.

In some embodiments, different techniques may be used to protect the data and to access the protected data. For example, an irreversible protection scheme may be used to combine multiple pieces of data into a single digital mixture, such that a selective retrieval scheme may be used to selectively retrieve pieces of data from the single digital mixture without obtaining access to other protected data in the digital mixture. In such an embodiment, when the data is properly accessed, it is selectively revealed, based upon the owner's wishes for the authorized recipient. The path to reveal information is not a function of retracing the original steps, and the original protection scheme used to combine the multiple pieces of data may not be reversible other than with respect to individually requested pieces of data. In other words, even though pieces of data stored by the protection scheme may be accessed, the totality of the digital mixture is not accessible in such a way that allows the totality of the original contents to be reconstituted. Embodiments of the present disclosure are configured to positively identify any user or entity identity such that is included as a participant as legitimate or not, and the data owner controls which portions or pieces of data to which the identified legitimate users can gain access. Unauthorized parties, whether inside or external to the intended recipient or the intended recipient's network, can never access the data in its unprotected form. Embodiments of the present disclosure unequivocally confirm the identity of a trusted party before providing access to ensure data security. Reversing or reverse engineering the protection scheme cannot yield the original results.

In several embodiments of the present invention, rules are executed by an executable portion of the digital mixture, ensuring the absolute wishes of the data owner are enforced without relying on a third party or an outside entity or application or operating system. The protection scheme is not dependent on an application or an operating system to protect/unprotect the data: the data is self-protecting and self-controlling. The protection scheme is independent of operating system, environment, and application (i.e., external or centralized or server key management, password management and identity management applications).

Methods in the protocol are implemented in executable code stored in the data mixture, and are executed in response to detecting a request by the user to access the data through a structured API. Furthermore, the data can be of any type (e.g., text, audio, video, or combination thereof), and in any kind of container, database or environment: (e.g., buffer, directory, file, or combinations thereof). Any attempt to access the data other than through the API or other means described herein will be foiled by the applied cloaking patterns, which will be undeterminable by any component outside of or other than the components implementing the API. When attempting to access the data through the API or other means described herein, the protection scheme ensures that legitimate users are only able to access data as permitted by the data owner.

Other methods initiated through the API, or other ICTO-aware application, device or operating system, initially validate the ICTO. Subsequently, the outer cloaking technology locates the executable code, cipher engine, or mixer stored in the digital mixture. A request for access is received by the executable code via the API or other ICTO-aware application, device or operating system on behalf of the agent. The executable code is energized, or "awakened," at which point the portable dynamic rule set takes and maintains control until the self-governed data object is closed or becomes inactive. Any attempt to access the self-protecting, self-controlling digital mixture without energizing the executable code will be unsuccessful.

FIG. 1 is a schematic diagram that illustrates an exemplary embodiment of self-governing data according to various aspects of the present invention. A dynamic participant controller 110, or "mixer," identifies a set of digital ingredients ("participants") 101, including descriptions of authorized agents, device locations, rules for using the data, and/or other ingredients as discussed further below. By mixing these ingredients, the mixer 110 forms a cloaked entity, the intelligent cipher transfer object, or ICTO 115. The ICTO 115 may also be called a "digital mixture." As discussed herein, one of ordinary skill in the art will recognize that the terms "ICTO" and "digital mixture" and "self-governing data" may be used interchangeably. To an unauthorized entity or third party viewing the ICTO 115 directly, the ICTO 115 may simply appear to be a set of data. The ICTO 115 appears to the outside as a homogenous mixture without resembling or exposing the original ingredients. However, when accessed via an application implementing the API (such as the mixer 110, an ICTO-aware client application (not illustrated), and/or the like), executable portions of the ICTO 115 are accessible to provide access to the data governed by the ICTO 115.

In some embodiments, the executable portions of the ICTO 115 may be stored at a determinable location within the ICTO 115 to allow an application implementing the API to easily find the executable portions. In some embodiments, additional protection may be applied to the ICTO 115 by storing one or more executable portions of the ICTO 115 at variable locations within the ICTO 115.

While these variable locations make the executable portions of the ICTO 115 exceedingly difficult for an unauthorized user to find, an ICTO-aware application implementing the API for accessing the ICTO 115 may be able to compute the variable locations for a given ICTO 115 based on a feature of the ICTO 115. For example, the secure application may read an attribute of the ICTO 115 such as a file size, a creation time, and/or the like, and may perform a calculation that determines the location using the attribute as a seed. By keeping the details of the calculation secret, the location of the executable portions of the ICTO 115 can likewise be kept secret.

The set of participants 101 may include object descriptions 102, mixture metadata 104, owner data 106, cloaking patterns 107, an identity module 109, and an intelligence module 111. In some embodiments, a combination of the identity module 109 and the intelligence module 111 may be considered together as a portable dynamic rule set 108. The object descriptions 102 may include owner-supplied and owner-defined earmarks, data identifiers, and/or properties. Owner data 106 may include data that is to be protected within the ICTO 115, such as a document, a file, a buffer, a directory, a pointer to remotely stored data, database, and/or the like. In some embodiments, owner data 106 may be optional, if the ICTO 115 is merely used, for example, for a signature verification method that is not associated with underlying signed data. In some embodiments, multiple pieces of owner data 106 may be included within a single ICTO 115. In some embodiments, owner data 106 from multiple owners may be included within a single ICTO 115.

The cloaking patterns 107 specify various combinations of data protection and access techniques supported by the mixer 110. The data protection and access techniques included in cloaking patterns 107 may include techniques such as industry standard verified encryption, compression, randomization, normalization, and/or other techniques. Techniques suitable for use as cloaking patterns 107 are not limited to currently known techniques, but could include any privately or publicly available encoding and/or decoding technique, known now or developed in the future. Use of a cloaking pattern 107 to protect and/or access data may involve applying the combination of data protection and/or access techniques specified in the cloaking pattern 107 to the data.

The mixture metadata 104 provides organizational information for the digital mixture 115, such as virtual file system data containing directories, key codes, user files, signatures, and/or the like.

The identity module 109 may include dynamic identity attributes that uniquely identify protected agents in a transaction. In some embodiments, the identity module 109 may include data that represents a configuration of a computing device that may be given certain rights with respect to a protected object. The identity module 109 may contain specific information about hardware or software configurations installed on the computing device usable to identify the computing device. The identity module 109 may contain data including, but not limited to, CPU information including model numbers, number of cores, speed, and/or the like; a chassis serial number; manufacturer data; a volatile memory size; a non-volatile memory size; one or more storage device serial numbers and/or model numbers; installed software titles and/or version numbers, and/or the like.

In some embodiments, a transaction is an atomic action using the ICTO 115 in which one or more agents securely exchange data within a given context and with a specified intent. Authorized agents may include human and non-human entities, such as a human user, a unique mechanical object, a unique electronic object, a unique software or program object, and/or the like. Dynamic identity attributes contained in the ICTO 115 may be modified by the intelligence module 111 within or during the course of an interaction with the ICTO 115, and may include application-specified identifiers, account identifiers, biometric signatures, device and/or location signatures, temporal data, cryptographic keys, and/or the like. In some embodiments, a location signature may include data from a geolocation technology, such as GPS, GSM network locating, IP address locating, dead reckoning, and/or the like. The location signature may include a longitude, latitude, an altitude, an approximate street address, and/or the like. Additional location data such as street, city, state, country, postal code, and/or the like may also be present. In some embodiments, the temporal data may include a timestamp and/or the like, which may allow rules or other intelligent code to enforce timers, expirations, dynamic keys, and/or the like. The temporal data may include a simple date/time value, or may include a complex schedule comprising timestamp ranges and/or other scheduling guidelines.

In some embodiments, each ICTO 115 includes at least one digital signature key. The digital signature key may be validated using an external digital certificate available to the mixer 110. During access of the ICTO 115, the mixer 110 validates the digital signature key using the external digital certificate and verifies that the digital signature key is valid for an agent currently accessing the ICTO 115. In some embodiments, multiple agents may sign off on the ICTO 115. In such an embodiment, the ICTO 115 may include a chain of signature keys, wherein each signature key may be associated with a separate external digital certificate for validation. For example, an ICTO 115 may be used by an owner to create a protected file for a transfer to multiple agents wherein each agent may access different sections of the file but not the entire file, either simultaneously or sequentially. Both the owner and the agents may have to provide valid digital sig-natures to allow the transaction to proceed.

The intelligence module 111 may include dynamic rule sets capable of recording and communicating access data and other relevant history; along with intelligent code that provides configurable functionality for performing actions to protect the ICTO 115. Rules may be provided at object creation time. However, in some embodiments, a rule may have a capability to modify itself or other rules for a previously created ICTO 115. In some embodiments, a rule may have a capability to create additional rules. For example, a rule may determine, from identity data, that additional protection is desirable for a given ICTO 115. The rule may then create additional encryption and/or decryption rules to be applied. The rules are protected and contained within the ICTO 115. In some embodiments, the rules may only be executable by an executable portion of the intelligence module 111, and/or may be written in a proprietary language and stored in com-piled or binary form. Based on the rules and requirements of the identity module 109, the intelligence module 111 acts on its rules and requirements. Application-specified identifiers may vary from access to access, and may vary depending on a type of agent. For example, for a human user, application-specified identifiers may include account keys, transaction information, context keys, associated intents, and/or the like. For an electronic object, a digital asset, or any other potential agent, application-specified identifiers may also include an IP address, a URL, a file specification, and/or the like.

In some embodiments, the embedded portable dynamic rule set or sets have read/write access to the embedded participants 101, even while the participants 101 are protected by the ICTO 115. In other words, a rule may read and write data to the mixture metadata 104 and the owner data 106 of the ICTO 115. This may be useful for recording access information such as date, time, place, and the like, and/or to destroy the data if an attack is detected. Some examples of decisions made or actions taken by intelligent code within rules may include, but are not limited to: evaluating object content and context for validity; challenging an agent for proof of identity; interacting with client code; contacting a server for validation; causing the ICTO 115 to self-destruct; maintaining a history of object access and sending the history information to a server; allowing on-line and/or off-line object access; creating new rules based on dynamic server updates; encrypting and decrypting data; mangling and unmangling data; and/or the like.

The use of portable dynamic rules may have various benefits. For example, pre-encryption and pre-decryption rules may provide dynamic salt and encryption keys based on participant-specified criteria. Such dynamic keys may be based on temporal data, environment data, or any other algorithm specified in a pre-encryption rule. As another example, rules may access encrypted identity artifacts within the ICTO 115 in order to validate the agent without exposing unprotected data to unauthorized users. As yet another example, because the rules are portable and are therefore included within the ICTO 115, rules may be written in such a way as to allow the ICTO 115 to be fully protected from unauthorized access even when off-line or out-of-network. As a further example, rules may add nested protection. If the ICTO 115 protects a document that is meant to be read by a single agent within one hour of creation, a rule may implement the timer and issue a self-destruct mechanism.

As stated above, the embedded mixer 110 uses an embedded portable dynamic rule set 108 to form a mixture of the object descriptions 102, the mixture metadata 104, the owner data 106, the cloaking patterns 107, the identity module 109, and the intelligence module 111 that comprises a self-protecting, self-governing ICTO 115. In some embodiments, various components of the ICTO 115 may be marked by encoded checksums to detect tampering. For example, the entire ICTO 115, the rules, the owner data, and/or the user data may each be validated by an embedded checksum. The checksum may be a hash value generated based on the contents of the checksum target. In some embodiments, the algorithm used to generate the checksum is sensitive enough to reliably detect a change of a single bit value of even a large data-set. Some suitable algorithms include MD5 and SHA, though any other suitable algorithm may be used. Each checksum may be appended, prepended, or otherwise combined with the checksum target for storage, or may be stored in a separate location.

Figure 7:
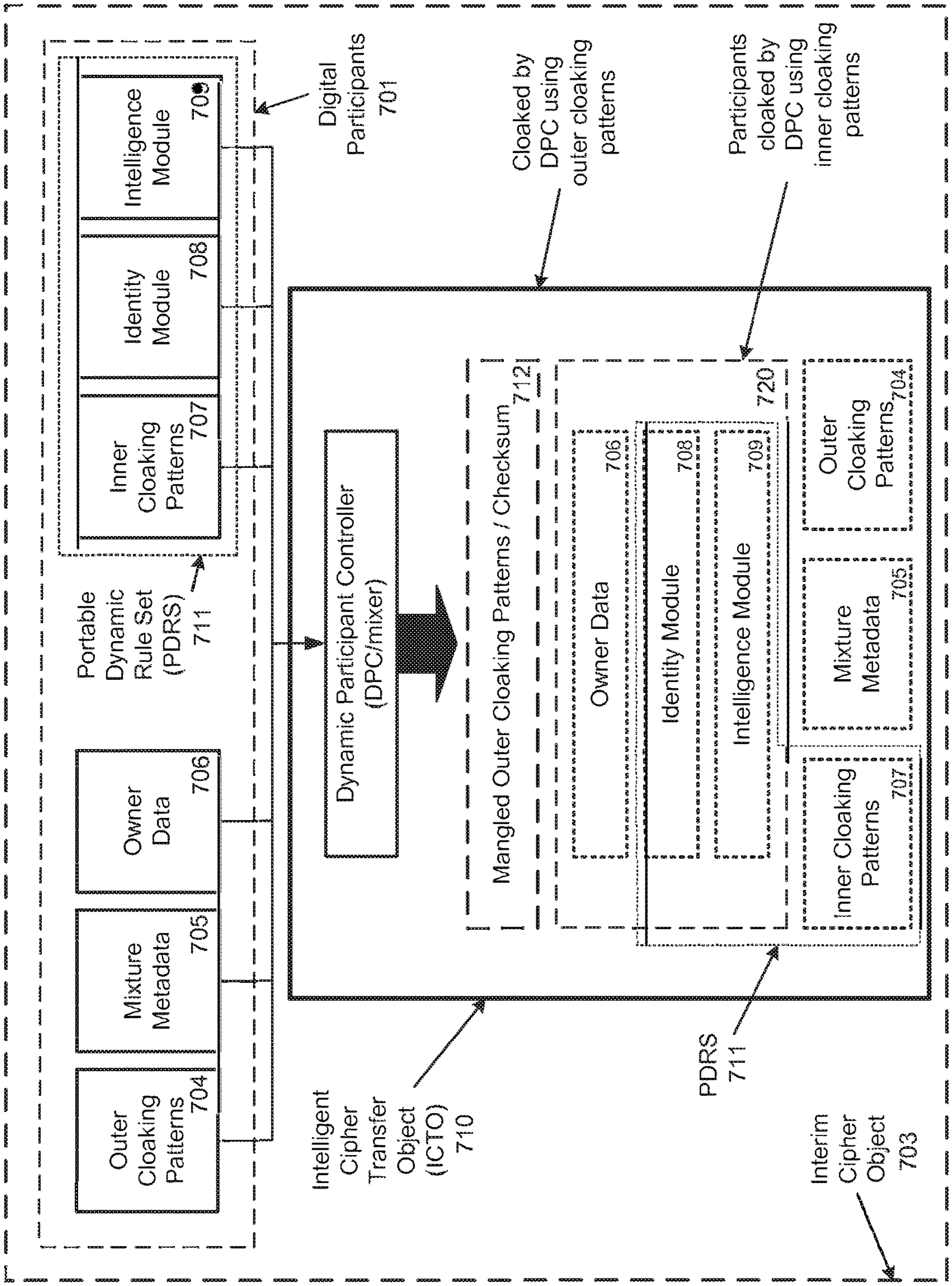
FIG. 7 shows a schematic diagram that illustrates an exemplary embodiment of data governance according to another exemplary embodiment of the present invention.

FIG. 7 is a schematic diagram that illustrates another exemplary embodiment of self-contained, self-controlling, self-governing data protection according to additional embodiments of the present invention. An API or other ICTO-aware application, device, or operating system initiates a request to the dynamic participant controller or executable mixer 702, thereby energizing it, to protect a set of digital participants 701. Digital participants include, but are not limited to, authorized agents, devices, locations, rules for using the data, and/or other digital ingredients as discussed further below, gathered for inclusion in the self-protecting, self-governing data object (i.e., digital mixture, or ICTO) 710. The dynamic participant controller 702, when energized, creates an interim cipher object 703 utilizing a temporary or "starter" rule set while said object is being constructed. The interim cipher object 703 is cloaked using one or more outer cloaking patterns 704 selected, created or produced by algorithms generated by the mixer 702.

In some cases, additional protection or functions, or combinations thereof, may be applied by storing one or more executable portions of the ICTO 710 at variable locations within the ICTO 710. The initial entry point for the executable portions of the ICTO 710 can only be calculated and located by an ICTO aware application, operating system or device. Once the executable or DPC 702 is located and awakened, a unique table of offsets is made available to the DPC 702 to locate the portable dynamic rule set 711 within the ICTO 710 which takes and maintains control while the ICTO 710 is active.

The set of digital participants 701 may include, but are not limited to, outer cloaking patterns 704, mixture metadata 705, owner data 706, inner cloaking patterns 707, an identity module 708, and an intelligence module 709. In some embodiments, a combination of the inner cloaking patterns 707, the identity module 708 and the intelligence module 709 can be considered together as the portable dynamic rule set (PDRS) 711. Owner data 706 that is to be protected within the ICTO 710 and governed by the PDRS 711, may include a number of data types, including, but not limited to, an image, a video, a message, an email, a document, a file, a buffer, a directory, a pointer to remotely stored data, a portal, and the like. In several embodiments, owner data 706 may be optional and thus not included, such as when the ICTO 710 is merely used, for example, as an irrefutable and certain signature verification method. In some embodiments, multiple pieces of owner data may be mixed into a single ICTO 710. In other embodiments, owner data from multiple owners may be included in a single ICTO 710. In further embodiments, multiple ICTOs could be mixed into a single ICTO.

The inner cloaking patterns 707 specify various combinations of data protection and access techniques determined by the owner's rules set forth in the portable dynamic rule set 711 and supported by the dynamic participant controller or mixer 702. The data protection and access techniques included in the inner cloaking patterns 707 may include, but are not limited to, techniques such as industry standard encryption, proprietary encryption, compression, randomization, normalization, and the like. Techniques suitable for use as inner cloaking patterns 707 are not limited to currently known techniques, but could include any privately or publicly available encoding and/or decoding techniques, known now or developed in the future. Use of an inner cloaking pattern 707 to protect and/or access data may involve applying the combination of data protection and/or access techniques specified in the portable dynamic rule set 711 to the data and other participants.

The outer cloaking patterns 704 specify various combinations of data protection and access techniques selected through one or more algorithms calculated, used, or created by the dynamic participant controller 702 utilizing the interim rule set to create the interim cipher object 703. The data protection and access techniques included in the outer cloaking patterns 704 may include, but are not limited to, techniques such as industry standard verified encryption, compression, randomization, normalization, and the like. Techniques suitable for use as outer cloaking patterns 704 are not limited to currently known techniques, but could include any privately or publicly available encoding and/or decoding technique, known now or developed in the future. Use of an outer cloaking pattern 704 to protect and/or access data may involve applying the combination of data protection calculated by the dynamic participant controller 702 and specified by the interim rule set. The mixture metadata 705 provides organizational information for the digital mixture 710, such as, but not limited to, virtual file system data containing directories, user files, and the like.

The identity module 708 may include dynamic identity attributes that uniquely identify legitimate agents in a transaction. Dynamic identity attributes can be learned information that are added to the identity module within the PDRS such as, but not limited to, location, device, and access behavior. Learned information is collected and can be utilized in a future access request session, thereby adding additional intelligence and decision points. Additionally, dynamic identity attributes can also be volatile (i.e., unpredictable) details. They may be presented during the authentication process, alone or in conjunction with personal identity attributes, in the determination of legitimate identification of an agent requesting access to an ICTO.

In some embodiments, the identity module 708 may include data that represents a configuration of a computing device that may be given certain rights with respect to a protected object. The identity module 708 may contain specific information about hardware or software configurations installed on the computing device usable to identify the computing device. The identity module 708 may contain data including, but not limited to, CPU information including model numbers, number of cores, speed, and/or the like; a chassis serial number; manufacturer data; a volatile memory size; a non-volatile memory size; one or more storage device serial numbers and/or model numbers; installed software titles and/or version numbers, and/or the like.

In several embodiments, a transaction is an atomic action using the ICTO 710 in which one or more legitimate and authorized agents securely exchange data or information within a given context and with a specified intent. Legitimate, authorized agents may include human and non-human entities, such as a human user, a unique mechanical object, a unique electronic object, a unique software or program object, or the like. Dynamic identity attributes contained in the ICTO 710 may be modified by the intelligence module 709 within or during the course of an interaction with the ICTO 710, and may include, but are not limited to, application-specified identifiers, account identifiers, biometric signatures, device and/or location signatures, temporal data, crypto-graphic keys or data, and the like. In some embodiments, a location signature may include data from a geolocation technology, such as GPS, GSM network locating, IP address locating, dead reckoning, and the like. The location signature may include a longitude, latitude, an altitude, an approximate street address, and the like. Additional location data such as street, city, state, country, postal code, and the like may also be present. In some embodiments, the temporal data may include a timestamp or similar information, which may allow rules or other intelligent code to enforce timers, expirations, dynamic keys, and the like. The temporal data may include a simple date/time value, or may include a complex schedule comprising timestamp ranges and/or other scheduling guidelines.

In some embodiments, each ICTO 710 may include one or more digital signature requirements, human or non-human. During authentication by the ICTO 710, the portable dynamic rule set 711 determines the digital signature to be valid for a legitimate, agent requesting access to information governed by the PDRS 711. In some embodiments, multiple legitimate agents may verify the authority of other legitimate agents. In such an embodiment, the PDRS 711 may enforce a chain of digital signature requirements, wherein each digital signature may be associated with a separate legitimate agent. For example, an ICTO 710 may be used by an owner to create a self-governing file for approvals, signature and transfer to multiple legitimate agents wherein each legitimate agent may access different sections of the file but not the entire file, either simultaneously or sequentially. Both the owner and the legitimate agents may have to provide valid digital signatures to allow the transaction to proceed.

The intelligence module 709 may include dynamic rule sets capable of recording and communicating access data and other relevant events; along with intelligent code that provides configurable functionality for performing actions to govern the ICTO 710. Rules may be provided at object creation time. However, in some embodiments, a rule may modify itself or other rules of a given ICTO 710 instance. In some embodiments, a rule may create additional rules. For example, a rule may determine, during authentication of a legitimate agent, that additional protection is desirable for a given ICTO 710. The rule may then create additional access, defensive, cloaking and the like requirements. In some embodiments, the rules may only be executable by the dynamic participant controller 702, or may be stored in a binary form as a participant of the ICTO, or a combination thereof. Based on the rules and requirements of the identity module 708, the intelligence module 709 acts on its rules and requirements as supplied by the owner agent. Portable dynamic rule set 711 identifiers may vary from access to access, and may vary depending on a type of agent. For example, for a human user, portable dynamic rule set 711 specified identifiers may include account keys, transaction information, context keys, associated intents, and the like. For an electronic object, a digital asset, or any other potential agent, portable dynamic rules set 711 identifiers may also include an IP address, a URL, a file specification, and the like.

In some embodiments, rules have read/write access to the digital participants 701, even while the digital participants 701 are protected by the ICTO 710. In other words, a rule may read and write data to the mixture metadata 705 and to the owner data 706 of the ICTO 710. This may be useful for recording access information such as date, time, place, and the like, and, in some cases, to destroy the data if an attack is detected. Some examples of decisions made or actions taken by the intelligence module 709 may include, but are not limited to: evaluating object content and context for validity; challenging an agent for proof of identity; interacting with client code; contacting a server for verification of trust; causing the ICTO 710 to self-destruct; maintaining a history of object access and sending the history information to a server, by email, SMS, FTP or stored with the ICTO 710; allowing on-line and/or off-line object access; creating new rules based on dynamic server updates; cloaking and de-cloaking data; and mangling and unmangling data.

The use of said portable dynamic rule sets 711 has various benefits and purposes. In one exemplary embodiment, access rules may utilize internally created, internally managed, unique keys based on owner-specified criteria. Said unique keys may be based on temporal data, environment data, or any other algorithm specified by an owner's rule set. As another example, said rules may access protected identity artifacts within the ICTO 710 in order to authenticate and validate the agent without exposing the protected data to the world. As yet another example, because said rules are self-contained, portable, platform independent and are therefore included within the ICTO 710, rules may be written in such a way as to allow the ICTO 710 to be fully protected from unauthorized access even when off line.

As a further example, rules may add nested protection. If the ICTO 710 protects one or more ICTOs 710 within the current or outer ICTO 710, the outer ICTO 710 may be able to communicate with one or more of the ICTOs 710 managed as part of the owner data 706 of each. Where the outer ICTO 710, or vice-versa, can cause the execution of rules managed within any of the ICTOs 710 included in the owner data 706 of the outer ICTO 710 or create new rules as a result of rules contained in one or more of the included ICTOs 710. Another example, the rules self-contained within the PDRS 711 of an ICTO 710 are self-governing. If the ICTO 710 protects a document that is meant to be accessed by a single legitimate agent within one hour of creation for a maximum of one hour after access, a rule may implement the timer and issue a self-destruct mechanism after expiry.

As previously described, the dynamic participant controller 702, or mixer, utilizing a portable dynamic rule set 711 creates a mixture of the outer cloaking patterns 704, mixture metadata 705, the owner data 706, the inner cloaking patterns 707, the identity module 708 and the intelligence module 709 that makes up the ICTO 710. In some embodiments, various components of the ICTO 710 may be combined for encoded checksums to detect tampering. For example, the entire ICTO 710, the rules, the owner data, and/or the participant data may each be validated by a checksum 712. The checksum 712 may be a hash value generated based on the contents of the checksum 712 targets. In some embodiments, the algorithm used to generate the checksum is sensitive enough to reliably detect a change of a single bit value of even a large document. Some suitable algorithms include MD5 and SHA, though any other suitable algorithm may be used. Each checksum 712 may be appended, prepended, or otherwise combined with the checksum target for storage, or may be stored in a separate location.

Figure 2:
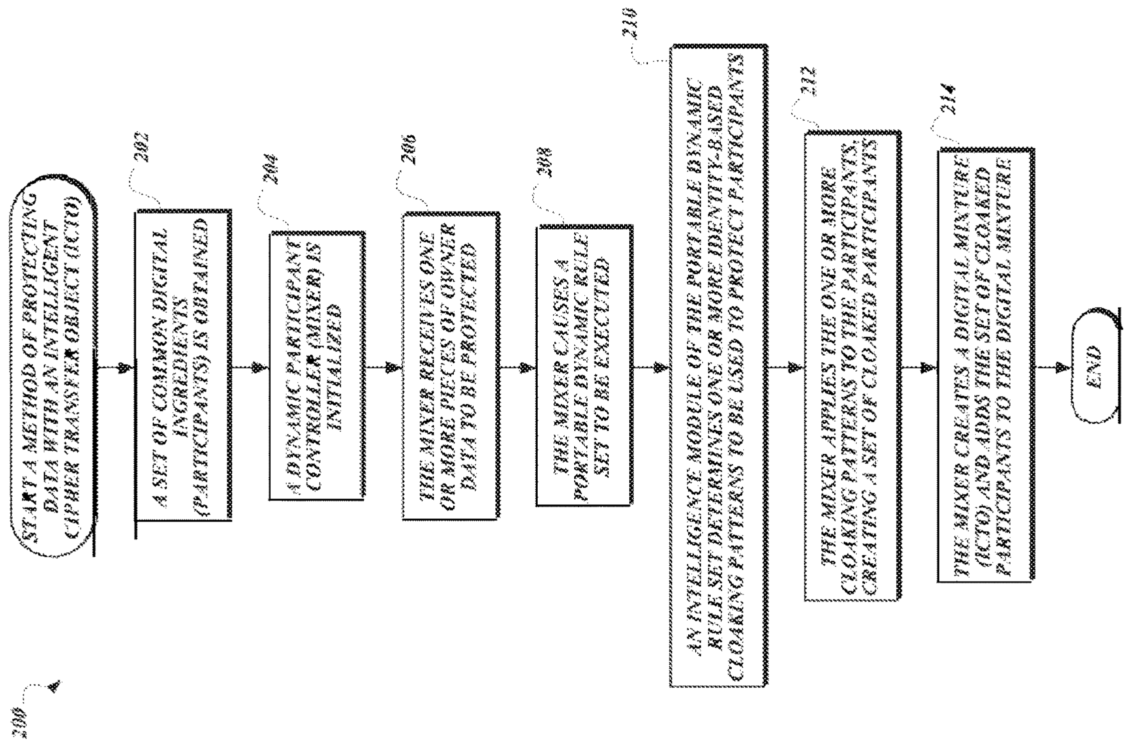
FIG. 2 shows a flowchart that illustrates an exemplary embodiment of a method of constructing an ICTO according to various aspects of the present invention.

FIG. 2 is a flowchart that illustrates an exemplary embodiment of a method 200 of constructing an ICTO 115 according to various aspects of the present invention. While the illustrated method 200 describes creation of a relatively simple ICTO 115, one of ordinary skill in the art will understand that similar techniques may be used to create much more complex ICTOs 115. In some embodiments, the mixer 110 is configured to perform the method 200. In some embodiments, the method 200 is performed by a computing device, as described below, that is configured to provide the functionality of the mixer 110. One of ordinary skill in the art will recognize that the construction and utilization of the ICTO 115 is neither dependent on the type of said computing device nor on any operating system associated with said computing device, but may instead by constructed and utilized via any suitable means.

From a start block, the method 200 proceeds to block 202, where a set of common digital ingredients or participants is obtained. The common participants are participants 101 which may be used in more than one ICTO 115, or may at least have similar corresponding components in more than one ICTO 115, and are specified and/or generated by the mixer 110 for inclusion in the ICTO 115. For example, the object descriptions 102, the mixture metadata 104, the cloaking patterns 107, the identity module 109, and the intelligence module 111 may all be common participants. Next, at block 204, a dynamic participant controller ("mixer") 110 is initialized. In some embodiments, initializing the mixer 110 may include verifying that the mixer 110 is being executed by an expected or otherwise trusted application. At block 206, the mixer 110 receives one or more pieces of owner data 106 to be protected. As discussed above, in some embodiments the owner data 106 may be optional, and the access protection features of the ICTO 115 may be used to verify user identities and/or obtain signatures from users.

The method 200 proceeds to block 208, where the mixer 110 causes a portable dynamic rule set 108 to be executed. At block 210, an intelligence module 111 of the portable dynamic rule set 108 determines one or more identity-based cloaking patterns to be used to protect participants 101, and at block 212, the mixer 110 applies the one or more cloaking patterns to the participants 101, creating a set of cloaked participants.

The portable dynamic rule set 108 determines a cloaking pattern to be applied to each participant 101 based on the desires of the owner of the data to be protected. Different cloaking patterns may be applied to each participant 101. Further, each participant 101 may be protected using separate cloaking patterns for access by different agents. In other words, a participant 101 such as owner data 106 may be protected by a first cloaking pattern for access by a first agent, and protected by a second cloaking pattern for access by a second agent. The selection of cloaking patterns may be based on an attribute of the participant 101 to be protected, an attribute of the agent to be given access to the data, a location, an intent, and/or any other suitable piece of information. Selection of a cloaking pattern may include selecting from a pre-existing cloaking pattern, and/or may include creating a new cloaking pattern from a combination of protection techniques supported by the mixer 110. Records of the applied cloaking patterns may be stored in the mixture metadata 104.

Cloaking patterns describe transformations applied to a participant 101 to protect the participant 101 within the ICTO 115, and how those transformations may be reversed to access the participant 101. The transformations may include, but are not limited to, data compression, data normalization, and encryption/decryption. A given cloaking pattern may include one or more of these techniques, or other techniques not listed here. Data compression may reduce the overall size of the ICTO 115, which may in turn improve transport times and bandwidth usage. Data compression may be performed by any suitable lossless compression algorithm including, but not limited to, DEFLATE, LZW, LZR, LZX, JBIG, DjVu, and/or the like. Data normalization is performed by any suitable process that places the data in a form that may efficiently be processed. In some embodiments, the data may be passed through a Base64 encoding algorithm to convert the data, whether binary or text format, into a normalized alphanumeric string. This is an example only, and should not be seen as limiting. In other embodiments, other algorithms may be used to normalize the data.

In some embodiments, a cloaking pattern may cause the identity module 109 and the intelligence module 111 to apply separate encryption techniques to different components of the participants 101. For example, a first encryption rule, when executed, may identify and encrypt a first portion of the encrypted digital mixture 115 while leaving a second portion of the encrypted digital mixture 115 unchanged. A second encryption rule, when executed, may then identify and encrypt the second portion of the encrypted digital mixture 115 using a different encryption algorithm, a different encryption key, and/or the like.

In some embodiments, the cloaking patterns and/or the portable dynamic rule set 108 may establish two or more nested layers of encryption. For example, execution of a first encryption rule may encrypt a first portion of the encrypted digital mixture 115. Execution of a second encryption rule may then cause the encrypted first portion of the encrypted digital mixture 115 to be encrypted again, along with the first encryption rule and a corresponding first decryption rule. Hence, to later access the first portion of the encrypted digital mixture 115, a second decryption rule corresponding to the second encryption rule is executed to decrypt the doubly encrypted first portion of the encrypted digital mixture 115 and to obtain the first decryption rule. The first decryption rule is then executed to decrypt the first portion of the encrypted digital mixture 115 to generate a plaintext version of the first portion of the digital mixture 115.

Once the cloaking patterns have been applied to the participants 101 to create the set of cloaked participants, the method 200 proceeds to block 214, where the mixer 110 creates a digital mixture (ICTO) 115 and adds the set of cloaked participants to the digital mixture 115. In some embodiments, additional protection may be applied to the digital mixture 115 as a whole, such as shuffling of the data, additional encryption or digital signatures, and/or the like. The method 200 then proceeds to an end block and terminates.

One of ordinary skill in the art will understand that certain steps have been omitted from FIG. 2 for ease of discussion. However, other steps not explicitly illustrated in FIG. 2 may also be included in the method 200 without departing from the scope of the present disclosure. For example, if any errors are detected while applying the cloaking patterns or executing rules, the method 200 may stop, and may not produce a completed ICTO 115. As another example, in some embodiments, the owner data 106 may include one or more ICTOs as a way of providing nested protection. In some embodiments, rules within a nested ICTO may be provided with access to participant data 101 within the outer ICTO 115. In some embodiments, a rule within a first ICTO may cause a second ICTO to be created, and cause the first ICTO to be added to the second ICTO such that the first ICTO is nested inside of the second ICTO. Likewise, in some embodiments, a rule within a first ICTO may cause a second ICTO to be created, and cause the second ICTO to be added to the first ICTO such that the second ICTO is nested inside of the first ICTO.

Figure 8:
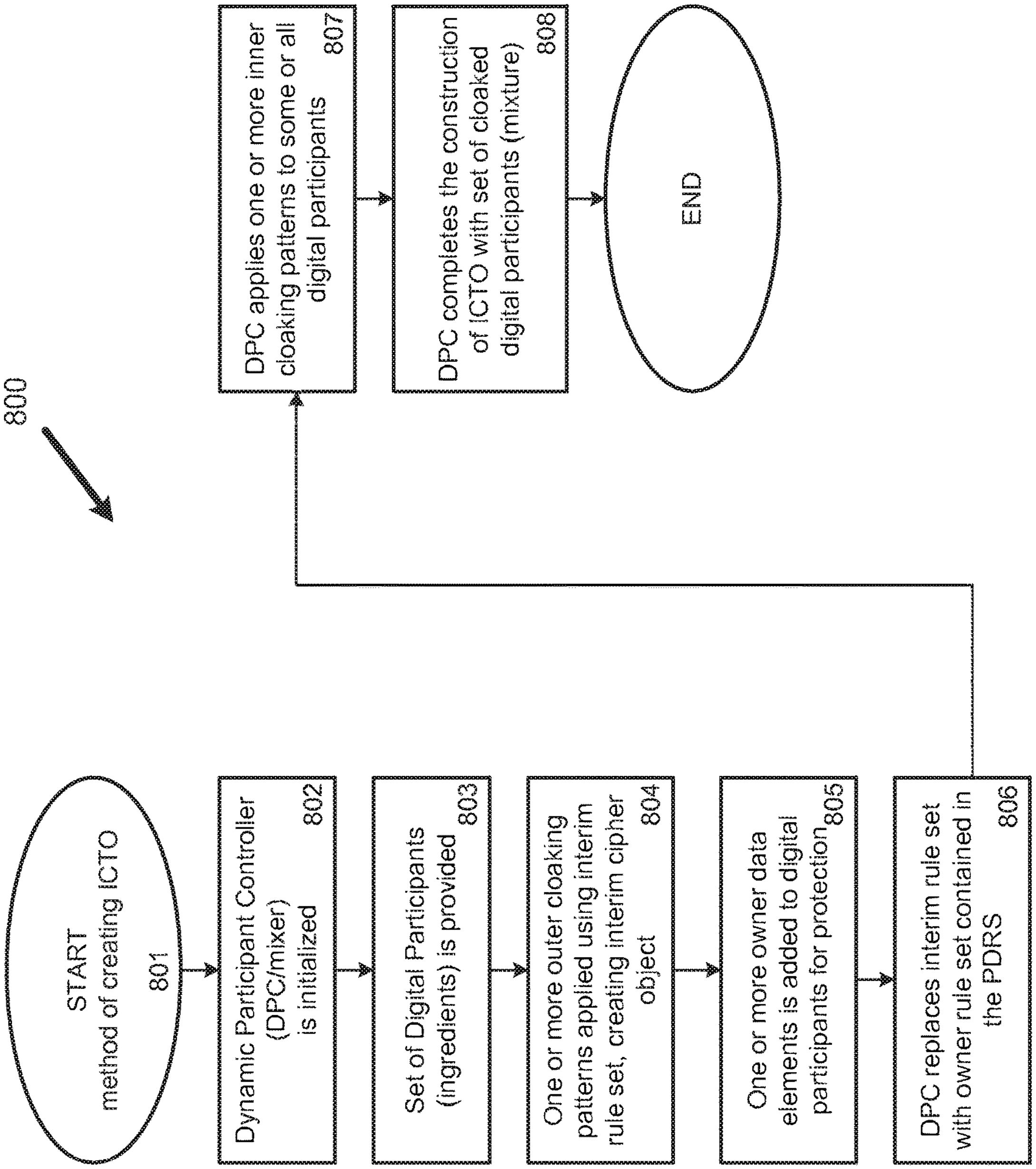
FIG. 8 shows a flow chart that illustrates a exemplary embodiment of creating an ICTO according to another exemplary embodiment of the present invention.

FIG. 8 is a process flow that illustrates an alternative exemplary embodiment of a method 800 of constructing an ICTO 710 according to various aspects of the present invention. The method 800 shown describes the creation of a simple ICTO 710;

however, utilizing similar techniques one may construct a complex ICTO. In some embodiments an ICTO-aware application, device or operating system is configured to initiate and facilitate the method 800. The construction and utilization of an ICTO 710, simple or complex, is not dependent on a specific operating system or device.

From Start 801, the method 800 begins with initialization 802 of the Dynamic Participant Controller 702 or mixer. In some embodiments, initialization of the mixer 802 may include validation that the object is an authentic ICTO and/or that the request to initialize is from an ICTO-aware application, device, operating system or other ICTO-aware process. Proceeding to block 803, a set of digital participants 701 is provided to the mixer 702 for inclusion in the ICTO 710. The digital participants 701 may be used in more than one ICTO 710, or may at least have similar or common components in more than one ICTO 710. For example, the outer cloaking patterns 704, the mixture metadata 705, additional cloaking patterns 707, the identity module 708, and the intelligence module 709 may all be considered common digital participants 701. Proceeding to block 804, the mixer 702 utilizing one or more algorithms selects one or more outer cloaking patterns 704 to be applied to the set of digital participants 701 utilizing an interim rule set to create the initial cloaking patterns for the ICTO 710, creating the initial interim cipher object 703. Proceeding to block 805, one or more owner data elements are added to the digital participants set for inclusion in the ICTO 710. In some embodiments, owner data 706 may be optional, and the access protection functionality of the ICTO 710 may be utilized to verify legitimate agent identities and/or for legitimate agent signatures.

The method 800 proceeds to block 806, where the owner's rules are obtained from the PDRS 711 and utilized by the mixer 702 to replace the interim rule set initially used in the creation of the ICTO 710. Proceeding to block 807, utilizing one or more algorithms the mixer 702 selects one or more inner cloaking patterns 707 to be applied to some or all of the digital participant set 701, inclusive of the owner data 706. The algorithms utilize time as a unique number and owner rules to further randomize the inner cloaking patterns 707. The algorithms used are added to the identity module 708, managed internally by the PDRS 711 and not shared externally. Finally in block 808 the mixer 702 completes the construction of the ICTO 710 creating a set of cloaked digital participants 720. While similar or common digital participants 701 may be utilized as provided in 803, in combination, the method will create a unique digital mixture 808 for each ICTO 710 constructed.

The mixer 702 using one or more algorithms determines which inner cloaking patterns 707 are to be applied to each digital participant 701 while also randomly applying time as a unique number and other internal factors generated by the intelligence module 709. The algorithms utilized by the mixer 702 to select the inner cloaking patterns 707 are then added to the identity module 708, managed internally and not shared/exchanged/exposed externally of the ICTO 710. Each participant 701 may be protected utilizing one or more inner cloaking patterns 707 that may be uniquely different from one or more inner cloaking patterns 707 protecting other participants 701 in the digital mixture 710. For example, a participant such as the owner data 706 may be protected with one or more cloaking patterns and internal rules that are uniquely different than the one or more inner cloaking patterns 707 and internal rules utilized to protect the identity module 708. Further, utilization of one or more inner cloaking patterns 707 and the random use of time as a unique number and internal rules in turn creates unique cloaking patterns that are added to the identity module 708 for each participant 701. The internal rules embedded in the intelligence module 708 may include but are not limited to such things as location, time, authorization requirements, and the like.

The inner cloaking patterns 707 describe transformations applied to a participant 701 to protect the participant 701 within the ICTO 710, and how some of those transformations may be reversed to access parts or all of the participant 701. The transformations may include, but are not limited to, data compression, data normalization, and encryption. A given inner cloaking pattern 707 may include one or more of these techniques, and/or other techniques. Data compression may reduce the overall size of the ICTO 710, which may in turn improve transport times and bandwidth usage. Data compression may be performed by any suitable lossless compression algorithm including, but not limited to, DEFLATE, LZW, LZR, LZX, JBIG, DjVu, and/or the like. Data normalization is performed by any suitable process that places the data in a form that may efficiently be processed. In some embodiments, the data may be passed through a Base64 encoding algorithm to convert the data, whether binary or text format, into a normalized alphanumeric string. This is an example only, and should not be seen as limiting. In other embodiments, other algorithms may be used to normalize the data.

Inner cloaking patterns 707 may also include one or more encryption techniques. The cloaking patterns may specify methods of deriving encryption keys, may specify particular encryption algorithms, such as, but not limited to, NIST or FIPS, other proprietary encryption algorithms, or key lengths, or may specify other configurable options such as time seeds, Xor encoding, or other industry standard encoding and decoding techniques for generating elements of the cloaking scheme, or combinations thereof. In some embodiments, encryption techniques may perform operations or calculations other than encryption, such as deriving a hash value for the referenced content or the like. In some embodiments, the inner cloaking pattern 707 may store (or may contain rules that require storage of) a record of an encryption key or decryption key used, either in the inner cloaking pattern 707 itself or elsewhere within the ICTO 710, managed internally and not shared externally. When the inner cloaking pattern 707 is used to access the protected information, the cloaking/de-cloaking algorithm(s) and keys are maintained internally and provided to the dynamic participant controller 702 within the ICTO 710 to provide access to the information, but are not available to the requesting agent or any other agent or application, device, operating system external to the ICTO 710. In other words, the cloaking/de-cloaking algorithms and keys are not stored or exposed outside of the ICTO 710, are not made available to any agents, and so there is no need for external key management functions, thus no vulnerabilities there from and their secrecy is maintained.

In some embodiments, the rules set forth in the intelligence module 709 may cause the mixer 702 to apply separate inner cloaking patterns 707 to separate components of the participants 701. For example, a first rule, when executed, may identify and apply a cloaking pattern to a first portion of the protected digital mixture 710 while leaving a second portion of the protected digital mixture 710 unchanged. A second rule, when executed, may then identify and apply a cloaking pattern to the second portion of the protected digital mixture 710 using a different cloaking pattern with a different pattern, or the like.

In some embodiments, the intelligence module 709 of the portable dynamic rule set 711 may require two or more nested layers of cloaking of some or all of the participants 701. For example, execution of a first rule by the mixer 702 may cloak a first portion of the protected digital mixture 710. Execution of a second rule by the mixer 702 may then cause the cloaked first portion of the protected digital mixture 710 to be cloaked again using a different inner cloaking pattern 707, along with the first rule and a corresponding first cloaking rule. Hence, to later access the first portion of the protected digital mixture 710 a second de-cloaking rule corresponding to the second rule is executed to de-cloak the nested cloaked first portion of the protected digital mixture 710 and to obtain the first de-cloaking rule. The first de-cloaking rule is then executed to de-cloak the first portion of the protected digital mixture 710 to generate a plaintext version of the first portion of the digital mixture 710.

Once the inner cloaking patterns 707 have been applied to the participants 701 to create the set of cloaked participants 720, the method 800 proceeds to block 808, where the mixer 702 completes the construction of a digital mixture (i.e., ICTO) 710. In some embodiments, additional protection may be applied to the digital mixture 710 as a whole, such as shuffling of the data, additional cloaking and/or the like. The method 800 then proceeds to an end block and terminates.

Other steps not explicitly illustrated in FIG. 8 may also be included in the method 800 without departing from the scope of the present disclosure. For example, if any anomalies are detected while applying the cloaking patterns or executing rules, the method 800 may stop, and may not produce a completed ICTO 710. As another example, in some embodiments, the owner data 706 may include one or more ICTOs as a way of providing nested protection. In some embodiments, rules within a nested ICTO may be provided with access to participant data 701 within the outer ICTO 710. In some embodiments, a rule within a first ICTO may cause a second or multiple ICTO(s) to be created, and cause the first ICTO to be added to the second ICTO such that the first ICTO is nested inside of the second ICTO. Likewise, in some embodiments, a rule within a first ICTO may cause a second ICTO to be created, and cause the second ICTO to be added to the first ICTO such that the second ICTO is nested inside of the first ICTO.

Figure 3:
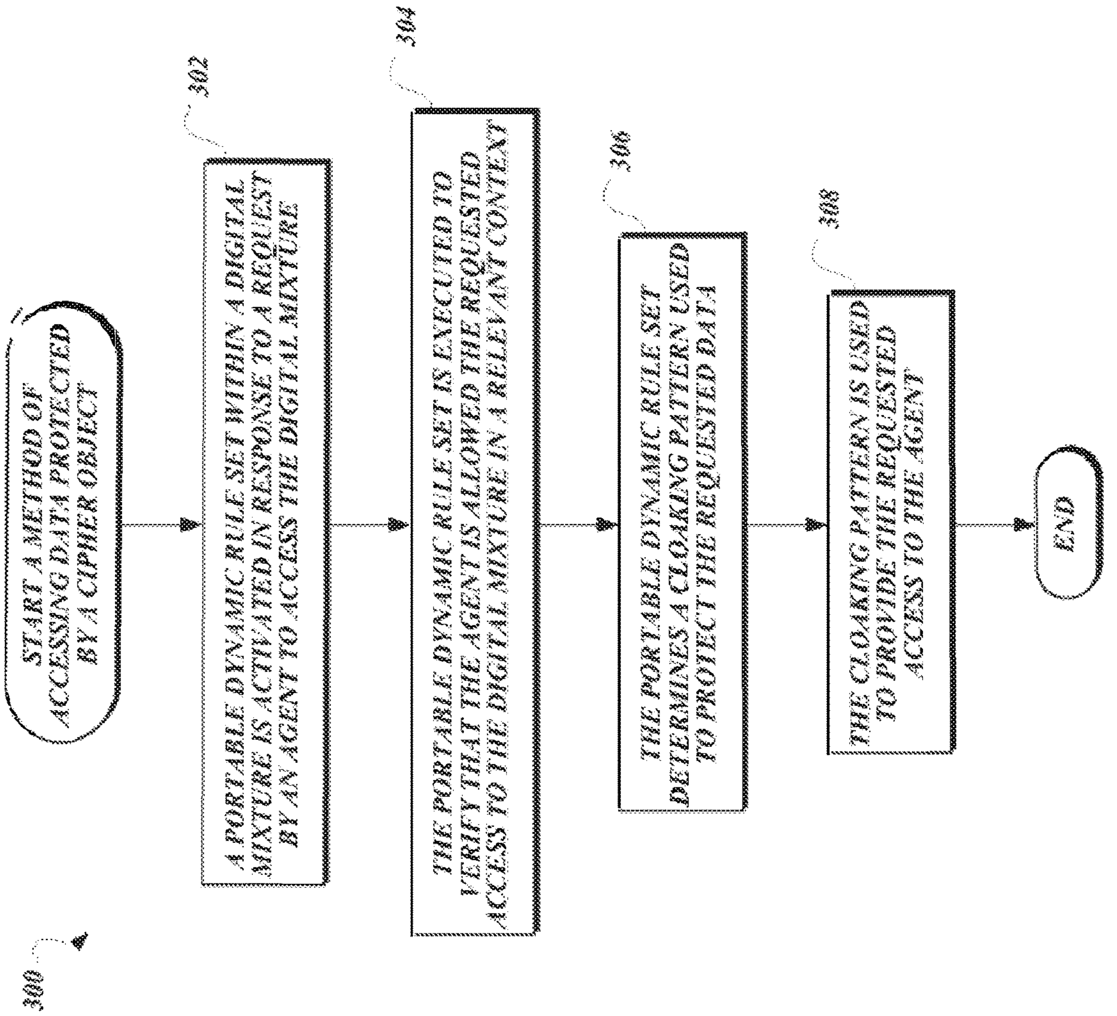
FIG. 3 shows a flowchart that illustrates an exemplary embodiment of a method of accessing data protected by an ICTO according to various aspects of the present invention.

FIG. 3 is a flowchart that illustrates an exemplary embodiment of a method 300 of accessing data protected by an ICTO 115 according to various aspects of the present disclosure. After the ICTO 115 is activated, the ICTO 115 begins verification and validation of its current environment, access attempts, authorized agents, and other conditions as specified in the rule set included in the portable dynamic rule set 108. This verification and validation may be performed once upon startup, continuously during an active period, periodically during an active period, or at any other suitable interval or in response to any suitable change in state. When rules and agent identity have been positively confirmed, the ICTO 115 permits access to authorized portions of itself while maintaining the homogenous essence of the mixture and protection of the rest of the data.

As with the method 200 described above, in some embodiments the mixer 110 is configured to perform the method 300. In some embodiments, the method 300 is performed by a computing device if one or more processors of the computing device execute computer executable instructions that cause the computing device to do so. As understood by one of ordinary skill in the art, the construction and utilization of the ICTO 115 is neither dependent on the type of said computing devices nor on any operating systems associated with said computing devices. The data protection protocol is embedded in the data set. An activated ICTO 115 can communicate with the data owner (information such as access attempts, alerts to unauthorized locations or unauthorized agents, notification of self-destruct or self-recreation) over the life of the data. Further, because the rules in the ICTO 115 may update themselves and other portions of the ICTO 115, the ICTO 115 may learn from its environment, and may change its future behavior based on that learning. The protection protocol can be customized and is unique to each owner, data set, and user combination, as specified in cloaking patterns.

From a start block, the method 300 proceeds to block 302, where a portable dynamic rule set 108 within a digital mixture 115 is activated in response to a request by an agent to access the digital mixture 115. In several embodiments, a super-identity is embedded in the ICTO 115 and includes criteria to verify an identity of an agent attempting to access the ICTO 115, dynamic rules to provide an intelligent awareness that validates the agent and determines the data's current state, and algorithms for data cloaking as specified in cloaking patterns. Verification criteria such as challenge/response pairs, digital signatures, biometric information, and/or the like may be used to verify the identity of the agent. At block 304, the portable dynamic rule set 108 is executed to verify that the agent is allowed the requested access to the digital mixture 115 in a relevant context. The identity module 109 and the intelligence module 111, when activated, assess the current access attempt by the verified agent and establish a level of trust. In some embodiments, this assessment is an on-going process, in that there is a continuous verification and validation of each participant 101: the data owner, the agent (data user) and the data itself. In some embodiments, pre access rules from the portable dynamic rule set 108 may be executed by the mixer 110 to decrypt at least some portion of the ICTO 115 for internal use by the mixer 110 without allowing access to the decrypted data to agents other than the mixer 110. Pre-access rules have access to the participants 101, including the ability to test identity artifacts and evaluate owner and agent data. If the trust level goes down, the proto col reassesses the participants 101. In some embodiments, if the agent attempting to access the ICTO 115 is unable to re-establish their legitimacy, defensive or offensive actions may be invoked. If the agent is able to satisfy the new set of challenges, access will be allowed to proceed or continue.

In some embodiments, the pre-access rules are merely allowed read access to identity or authentication data, but in some embodiments, the pre-access rules may also have write access, which may be used, for example, to record access attempt attributes when opening (or attempting to open) the ICTO 115.

The method 300 proceeds to block 306, where the portable dynamic rule set 108 determines a cloaking pattern used to protect the requested data. The portable dynamic rule set 108 consults the mixture metadata 104 to determine which cloaking pattern 107 was applied based on the identity of the agent, the data request, the context in which the data is being requested, and/or the like. Once the used cloaking pattern 107 is determined, the method 300 proceeds to block 308, where the cloaking pattern 107 is used to provide the requested access to the agent. Similar to how the cloaking pattern 107 indicated a set of techniques used to protect the requested data, the cloaking pattern 107 also indicates a set of techniques used to reconstruct the requested data from the protected version stored in the ICTO 115. The method 300 then proceeds to an end block and terminates.

Figure 9:
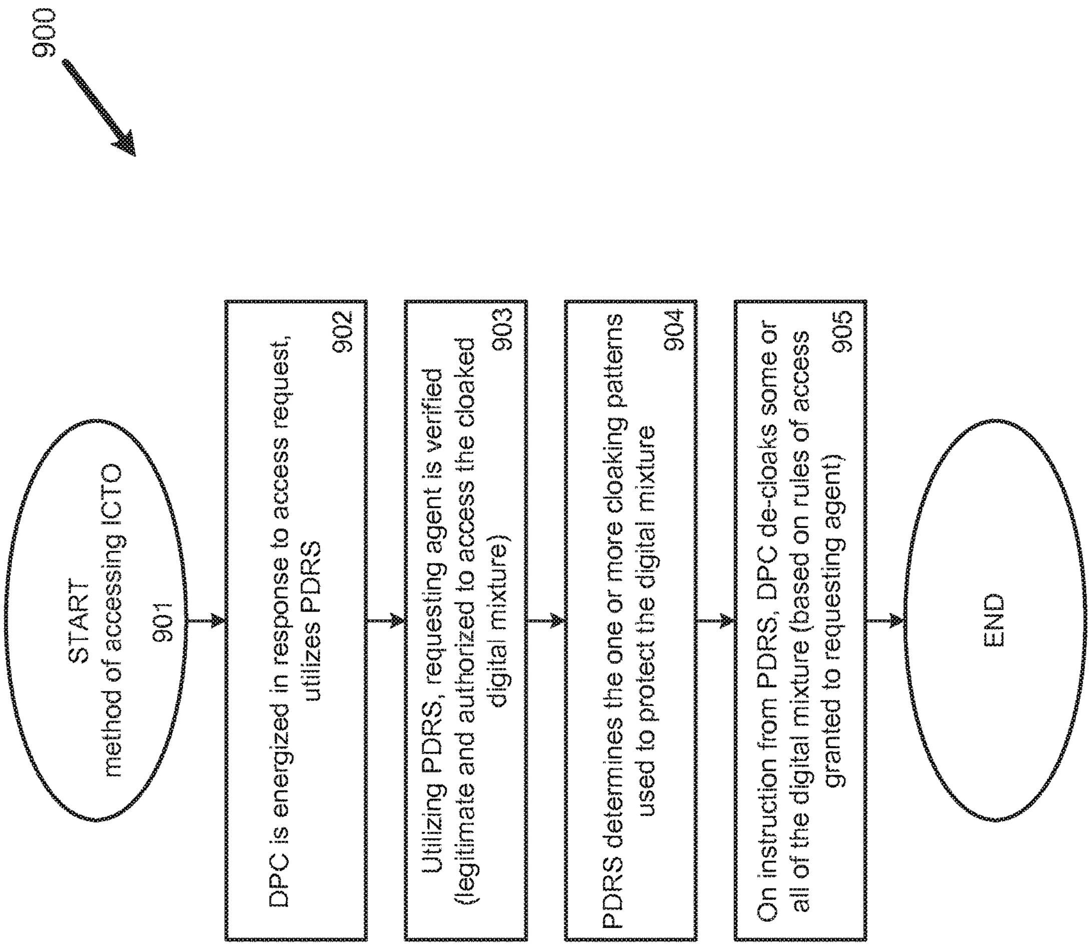
FIG. 9 shows a flow chart that illustrates a exemplary embodiment of accessing an ICTO according to another exemplary embodiment of the present invention.
Figure 10:
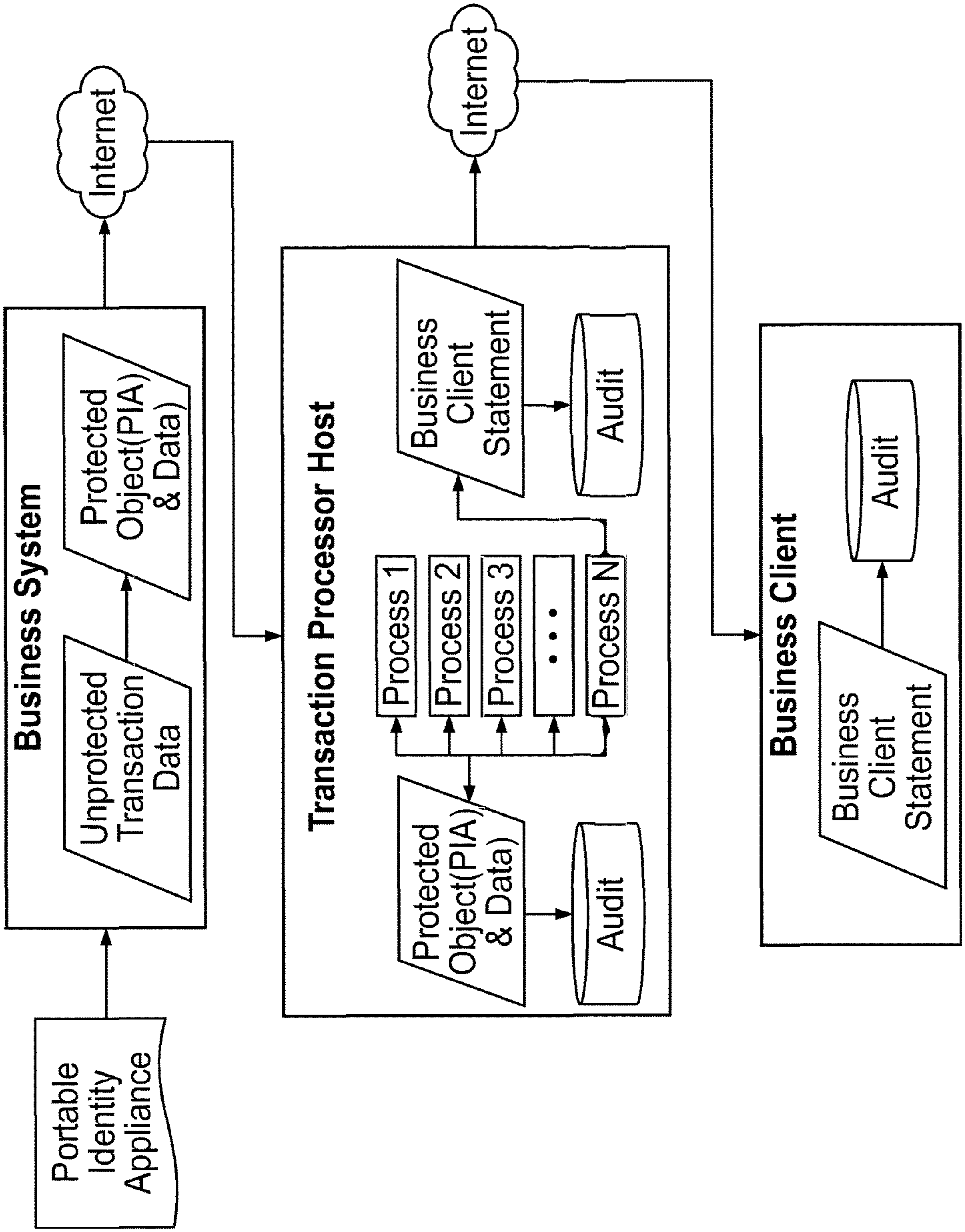
FIG. 10 shows a view of a portable identity appliance system in accordance with another exemplary embodiment of the present invention.
Figure 11:
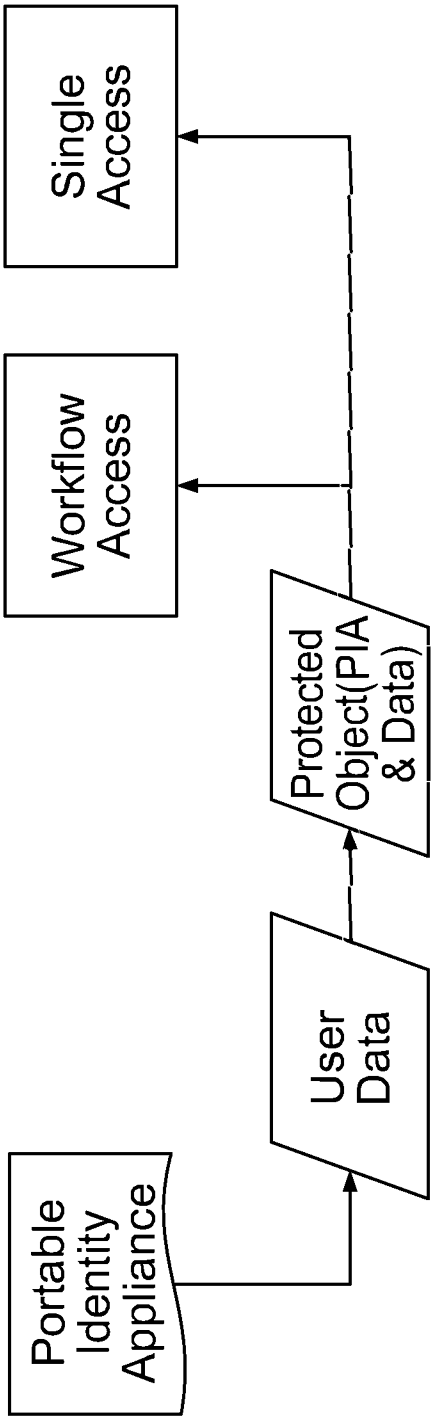
FIG. 11 shows a diagram of a portable identity appliance used to produce a protected object.
Figure 12:
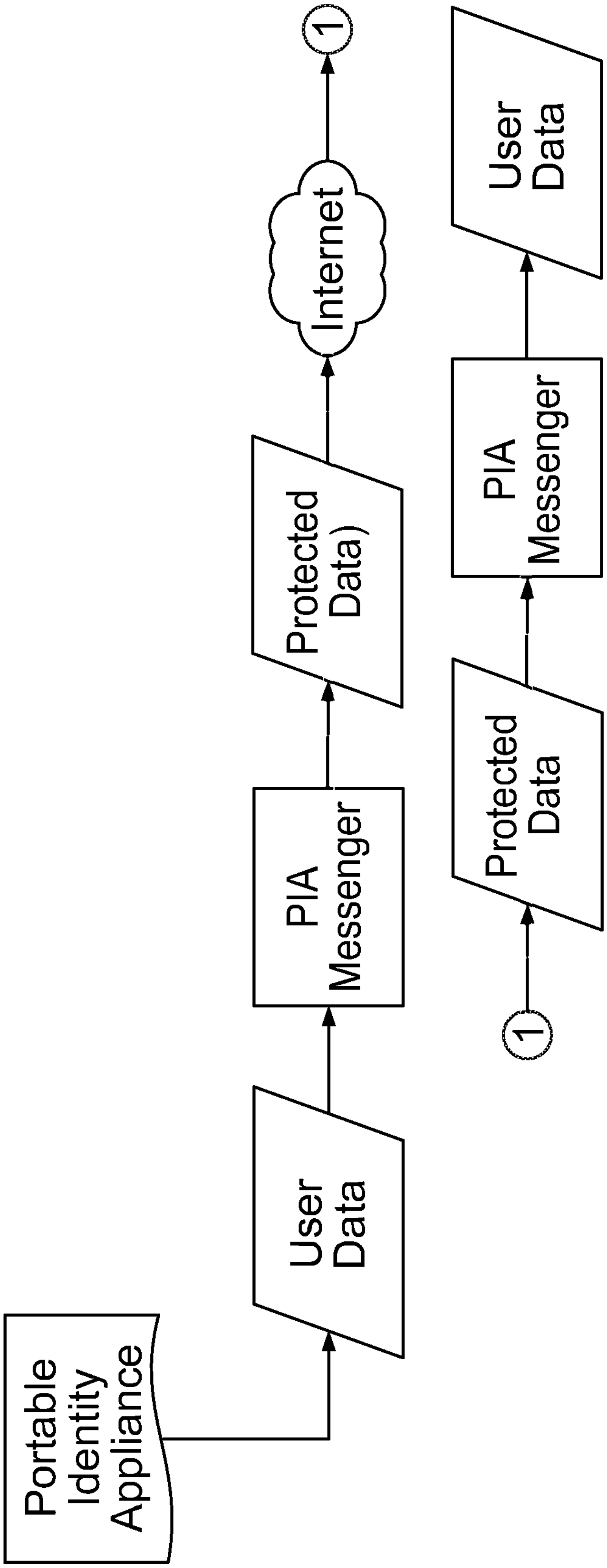
FIG. 12 shows a diagram of a portable identity appliance used to facilitate secure messaging of protected data.
Figure 13:
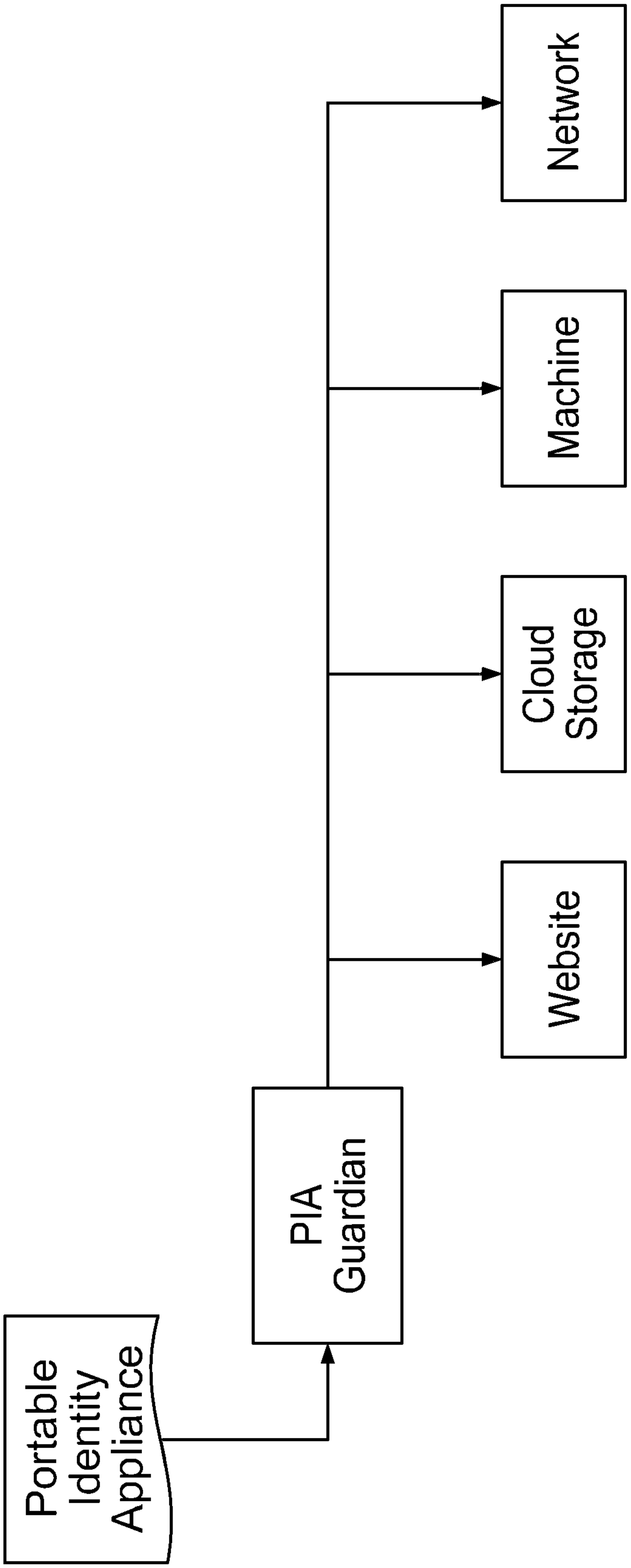
FIG. 13 shows a diagram of a portable identity appliance used to guard access to websites, portals, networks, or other resources.

FIG. 9 is a process flow that illustrates an alternative embodiment of a method 900 of accessing data protected by an ICTO 710. After the ICTO 710 is activated, the PDRS 711 begins verification and validation of the ICTO's 710 current environment, access attempts, legitimate agents, and other conditions as specified in the PDRS 711. This verification and validation process is inherently efficient, ensures the integrity of the data and may be performed once upon startup, continuously during an active period, periodically during an active period, or at any other suitable interval or in response to any suitable change in status or state. When rules and legitimate agent identity have been positively confirmed, the PDRS 711 permits access to authorized portions of ICTO 710 while maintaining the homogenous essence of the mixture and protection of the rest of the participants. In some embodiments, an ICTO-aware application, device or operating system is configured to initiate and facilitate the method 900.

From a start block 901, the method 900 proceeds to block 902, where the dynamic participant controller 702 within the protected digital mixture or ICTO 710 is energized by an ICTO-aware application, device, or operating system in response to a request by an agent to access the digital mixture or ICTO 710. In some embodiments, the owner/agent identity and/or one or more agent identities are included in the identity module 708 embedded in the ICTO 710 and includes criteria to verify the identity, authenticity and legitimacy of an agent attempting to access the ICTO 710, dynamic rules to provide an intelligent awareness that validates the legitimacy of the agent and determines the data's current state, and algorithms for data cloaking as specified in cloaking patterns. Verification criteria such as challenge/response pairs, external authorizations, biometric information, and/or the like may be used to authenticate, validate and/or verify the identity of the agent. At block 903, utilizing the portable dynamic rule set 711, the requesting agents are verified in an efficient, full, complete and relevant context and granted access to the digital mixture 710.

The method 900 proceeds to block 904, where the portable dynamic rule set 711 provides the dynamic participant controller 702 one or more cloaking patterns used to protect the requested data based on the identity of the agent, the data request, the context in which the data is being requested, and the like. Proceeding to block 905, the DPC or mixer 702 on instruction from the portable dynamic rule set 711 de-cloaks some or all of the protected data within the ICTO 710 based on the data owner's rules for the legitimate agent, the data request, the context in which the data is being requested, and/or the like managed by the portable dynamic rule set 711.

Other steps not explicitly illustrated in FIG. 9 may also be included in the method 900 without departing from the scope of the present disclosure. For example, if any anomalies are detected while applying the de-cloaking patterns or executing rules, the method 900 may stop, and may not allow access to the protected ICTO 710. Another example, the method 900 may determine legitimacy of a requesting agent to ICTO 710 which may cause external authorizations to be required prior to completion of authorization of the legitimate agent. Additionally, alerts may be sent as a result of legitimate and authorized access to the ICTO 710. As another example, in some embodiments, the method 900 may determine that unauthorized access is being attempted which may cause the PDRS 711 within the ICTO 710 to send alerts, record access attempts and/or the like. In another example, in some embodiments, the method 900 may determine an unauthorized access attempt is underway, and enable access to false data in the ICTO 710, recording activity, sending alerts and/or the like. Alerts include, but are not limited to, failed access attempt, unrecognized access address (which can include device and location specifics), schedule violations, unauthorized movement of an ICTO, and the like.

Accordingly, the present invention results in an ICTO that is self-contained, self-controlling, and self-governing. All access rights, rules of engagement, compliance rules, audit requirements, and similar rules and restrictions as determined by the data owner are contained in the PDRS, and embedded in the ICTO, and thus controlled on behalf of the data owner by the PDRS (whether online or offline, control is maintained from within the ICTO), and executed by the PDRS. The PDRS is the means for self-governance and control upon creation and throughout the life of the ICTO. It travels with the ICTO, complies at all times with the rules established by the data owner, and can be adaptive (i.e., dynamic), based on, but not limited to, the environment (such as place, time, and device), so to self manage and make decision based on learned information. The PDRS does not require any outside sources (e.g., IAM or SIEM systems) or specific operating environments to maintain control and governance. The PDRS controls the complete management of the ICTO from within the ICTO. The PDRS is permanently embedded in the ICTO and travels with the ICTO, thereby creating a self-contained, self-controlled, self-governing entity.

Figure 4:
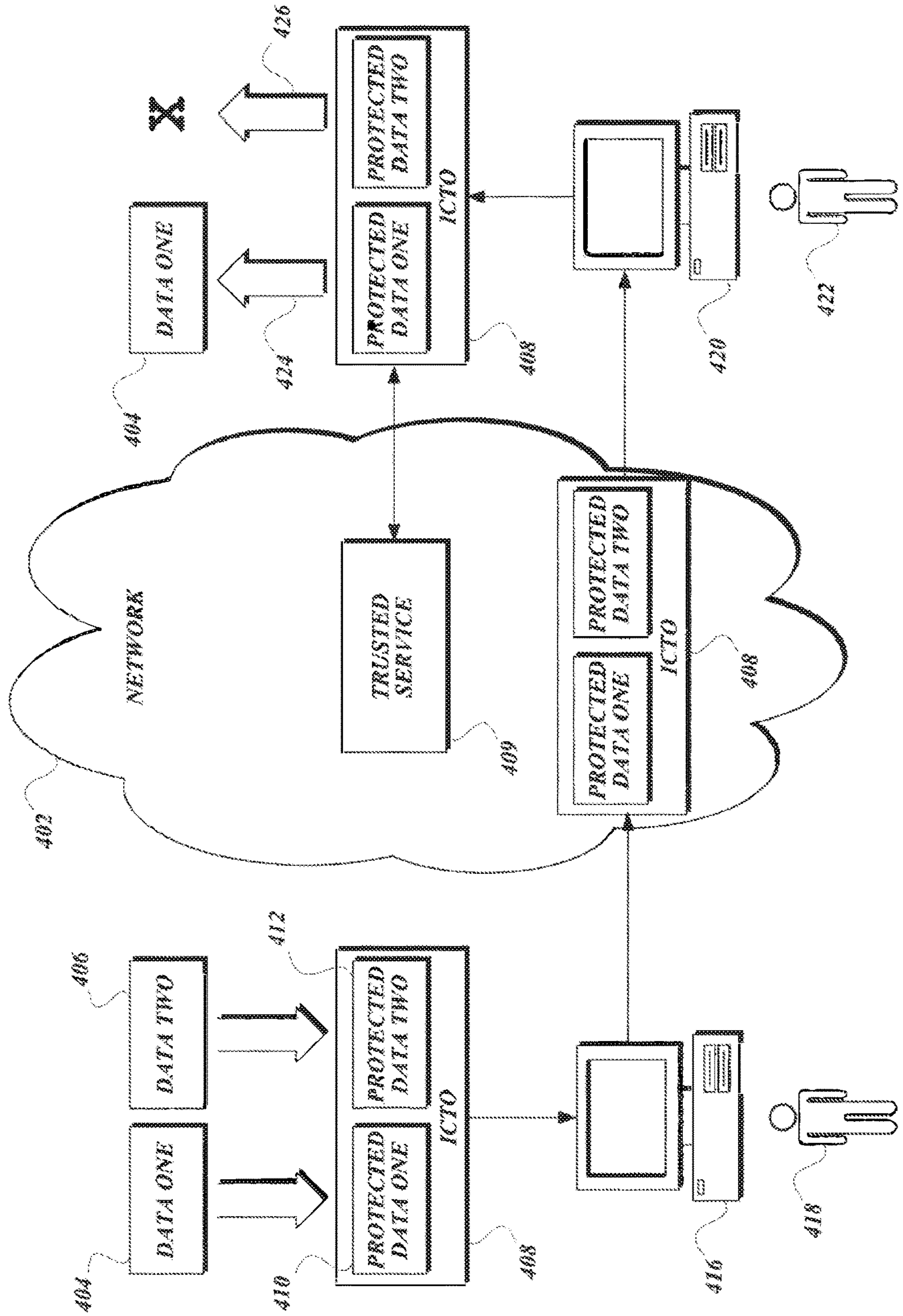
FIG. 4 shows a schematic diagram that illustrates an exemplary use case for an embodiment of the present invention.

FIG. 4 is a schematic diagram that illustrates an exemplary use case for an embodiment of the present disclosure. One of ordinary skill in the art will recognize that this use case is exemplary only and is described to show certain features of the disclosure, but that this use case does not utilize or describe every feature of the technology disclosed herein. In FIG. 4, a first user 418, using a first computing device 416, uses an embodiment of the present disclosure to protect a first piece of data (data one 404) and a second piece of data (data two 406). An ICTO 408 is created that includes a protected version of data one 410 and a protected version of data two 412. In creating the ICTO 408, the first user 418 specifies that a second user 422 may access data one 404, but does not specify that the second user 422 may access data two 406. Hence, the ICTO 408 includes a rule in its portable dynamic rule set 108 that allows user two 422, once verified, to access data one 404.

The first computing device 416 transmits the ICTO 408 to a second computing device 420 used by the second user 422 via a network, such as a LAN, a wireless network, the internet, and/or the like. The second user 422 causes the ICTO 408 to be activated, and submits a request 424 to access to data one 404. The ICTO 408 verifies the identity of the second user 422, which may include processing a challenge/response pair stored in the ICTO 408 and/or consulting a trusted service 409 (such as a certificate server, a RADIUS or other authentication server, and/or the like) to verify that the second user 422 is who he purports to be. Once the identity of the second user 422 is verified, the ICTO 408 consults the cloaking pattern used to create protected data one 410, and uses the cloaking pattern to give the second user 422 access to data one 404. The second user 422 may also submit a request 426 to access data two 406. However, because the ICTO 408 has not been instructed to provide access to data two 406 for the second user 422, the ICTO 408 does not allow the second user 422 to access data two 406.

In an alternate process flow, a first computing device 416 transmits an ICTO 408 to a second computing device 420 used by the second user 422 via a network, such as a LAN, a wireless network, the internet, and/or the like. The second user 422 utilizing an ICTO aware application, device or operating system awakens the ICTO 408 which receives a request to access protected data one in the ICTO 408. The ICTO 408 verifies the identity of the second user 422, which may include processing of multiple pairs of challenge/response stored in the ICTO 408 and/or external authorization or the like to verify that the second user 422 is valid and authorized. Additionally a trusted service 409 may be used for further validation of time, physical location and the like based on the rules of access set forth by owner 418. Once the identity of the second user 422 is verified (i.e., established as authentic and legitimate), the ICTO 408 determines the one or more cloaking patterns used to create protected data one 410, and de-cloaks the protected data one 410 revealing data one 404 to the second user 422. The second user 422 may also request to access protected data two 412. However, because the second user 422 is not authorized to access protected data two in the ICTO 408, the second user 422, is not granted access to the protected data two 412.

Though a trusted service 409 that provides authentication services is described, other types of trusted services may be used. For example, if a rule is included the ICTO 408 that only allows access during a given time period, a trusted service 409 that provides a trusted date-time value may be used. As another example, a trusted service 409 may seek input from other users while the ICTO 408 is determining whether to grant access to an agent. As illustrated, a trusted service 409 may notify the first user 418 of the access attempt via email, SMS, or any other suitable technique, and may wait to allow the attempted access until a corresponding approval is received from the first user 418.

This use case illustrates several advantages of the present disclosure. Once the ICTO 408 is created, protected data one 410 and protected data two 412 cannot be accessed without invoking the processing of the ICTO 408 to request access. Accordingly, the data is protected when the ICTO 408 is stored on the first computing device 416, when the ICTO 408 is in transit on the network 402, and when the ICTO 408 is stored on the second computing device 416. Also, even though the ICTO 408 provides access to the second user 422 to data one 404, data two 406 is nevertheless protected from access.

Figure 5:
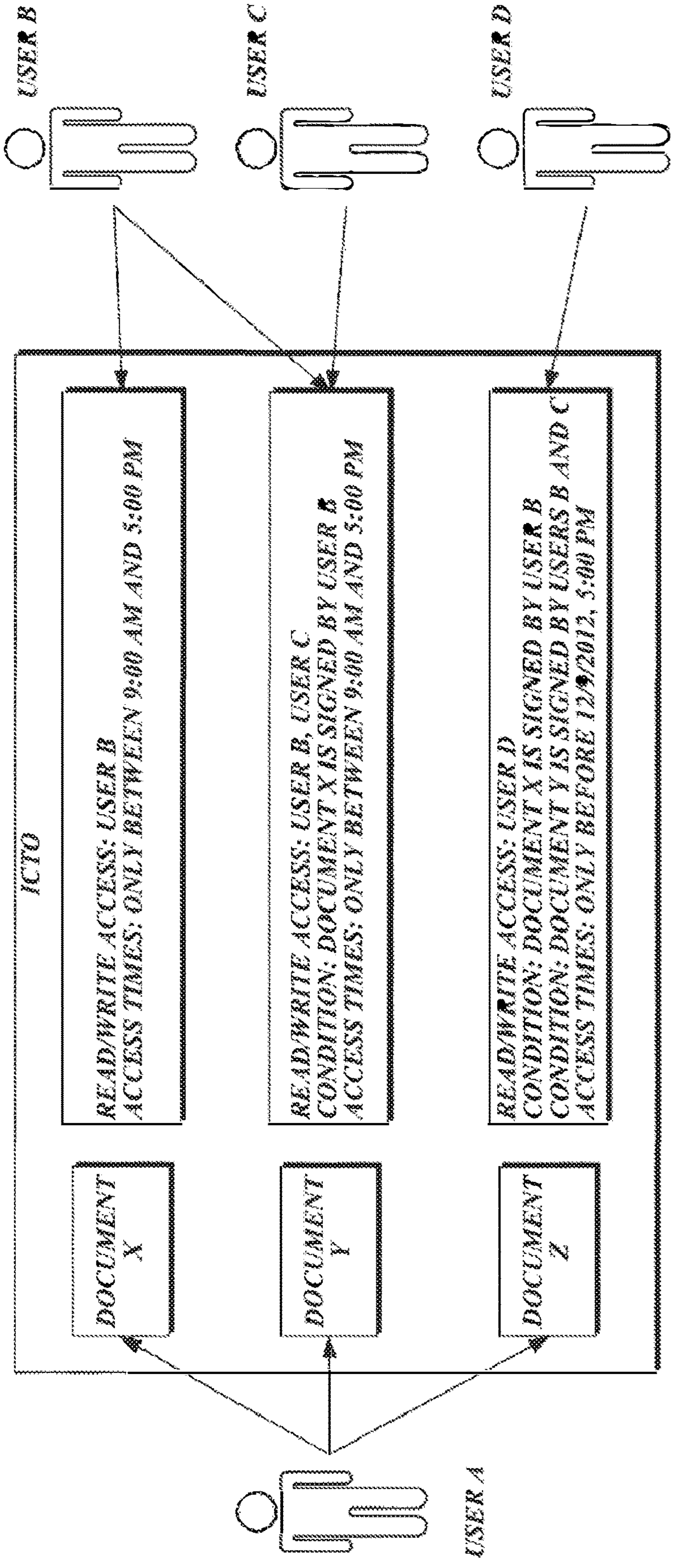
FIG. 5 shows a schematic diagram that illustrates aspects of an exemplary workflow for an embodiment of the present invention.

While this simple use case illustrates several features of the present disclosure, much more complex use cases are also possible. For example, FIG. 5 is a schematic diagram that illustrates aspects of an exemplary workflow for an embodiment of the present disclosure. A first user ("User A") may have a set of documents ("Documents X, Y, and Z") to be approved and signed, maintaining confidentiality throughout the transaction, by a second user ("User B"), a third user ("User C"), and a fourth user ("User D"). Document X needs to be signed by User B. Document Y needs to be signed by User B and User C, but only after Document X has been signed. Document Z needs to be signed by User D, but only after Documents X and Y have been signed. Further, Document X and Document Y must be signed during working hours (e.g., between 9 AM and 5 PM) to ensure compliance with local corporate policy, while Document Z (the working draft of Doc Y) must be signed immediately upon approved signatures of Doc X and Y, the audit logged, and then Doc Z destroyed, with the audit also logged.

Embodiments of the present disclosure will support such a workflow. User A creates an ICTO that includes Documents X, Y, and Z. User A creates an access rule for Document X that allows User B to review and sign Document X. User A creates an access rule for Document Y that allows User B and User C to review and sign Document Y once the signature on Document X is obtained. User A may create an access rule for Document X that allows User C to review Document X to check for a signature, or the access rule for Document X may detect the signature applied to Document X. and may dynamically update the access rule for Document Y that allows it to be signed once the signature is detected. User A creates an access rule for Document Z that checks for signatures on Documents X and Y, and upon detecting such signatures, User D is allowed to sign Document Z. Each of these rules also enforces the associated time requirements, and does not allow access if the time requirements are not satisfied. User A may also create a rule that reports any access to any of the documents back to User A, so that User A may monitor the process. Each of the rules may specify how each user is to be identified, the related privileges, devices from which the users are allowed to access the documents, and locations from which the users are allowed to access the documents.

Once, for example, User B receives the ICTO, User B invokes an application configured to activate the executable code within the ICTO. The executable code determines the identity of User B, either by consulting a trusted identity service, by checking the response to a challenge included in a rule, or by any other method. Once the identity, time, location, and other requirements are satisfied, User B is allowed to access Document X, but not any of the other documents. After User B signs Document X, the ICTO is transferred to the next user, and enforces the protections on the documents as the ICTO passes through the rest of the workflow.

Alternatively, for example, User B receives the ICTO, User B invokes an ICTO aware application, which activates the PDRS within the ICTO. The executable code determines the identity of User B by utilizing the identity credentials stored within the ICTO which presents multiple challenge/response pairs and/or external authorizations codes. Once the identity, time, location, and other requirements are satisfied, User B is allowed to access Document X, but not any of the other documents. After User B signs Document X, the ICTO is transferred to the next user, and enforces the protections on the documents as the ICTO passes through the rest of the workflow.

In another exemplary embodiment, protection protocol is instituted in a portable identity appliance (PIA). The PIA defines a portable and discrete digital identity using an instinctive and autonomic authentication method. The PIA ultimately implements an incorporated ICTO protocol, thus becoming an intelligent object itself. In several embodiments, the PIA is an ICTO that does not include owner data (e.g., files, images, and the like). The PIA comprises an ICTO that utilizes the PDRS along with additional publically available information (similar to the information available on a business card or in a public directory) about the owner, but without necessarily containing owner data, the PIA thus is a self-protecting, self-controlling, self-governing ICTO with the purpose of representing, irrefutably, the owner identity.

As seen in FIGS. 10-13, once the protected PIA is created, it can combine with data to produce a protected data object, facilitate the transmission of secure message between one or more parties (e.g., validating and maintaining sender and receiver legitimacy and data integrity), and provide a secure, trustworthy identity that can be used to assure or guard websites, portals, networks, or other resources.

The PIA thus present numerous advantages over existing signature techniques. Existing signature techniques are typically based on certificates that are purchased from a certificate authority. Certificates are presumed trust-worthy based on who holds the cert and who issues the cert. However, certificates can be stolen, can be spoofed, and are not based on a uniquely defined identity.

Thus, a ICTO may be used for irrefutable verification of identity where a "signature" is required. Signature ICTOs can be utilized as external identity verification in conjunction with an ICTO containing legal documents requiring absolute verification of identity. The Signature ICTO(s) can become part (embedded) of the "final" legal documents contained within the original ICTO. Further, Signature ICTOs can be included within the ICTO (i.e., nested) as additional protected data elements in addition to the owner documents requiring signature, thus pre-defining and providing pre-verification of the required signers traveling with the documents. Signature ICTOs also can be used as irrefutable verification of identity in documents that are not included in an ICTO but rather in an ICTO aware application. For example, they can be used to provide acceptance of Terms and Conditions electronically, or acknowledgement of privacy notices.

Signature ICTOs in the context of document signing can be thought of as a digital version of the owner that has been "legally verified and notarized," but also is irrefutable. Each Signature ICTO, just like an ICTO with owner data, is unique and therefore cannot be "spoofed" by a person or entity trying to pretend to be the actual owner of the Signature ICTO. Additionally, a Signature ICTO does not have to represent a human; it can represent a machine, whereby a digital process flow requires signatures (verifications) along the way in order to confirm the validity of the authorization to proceed; and this signature must be documented. Signature ICTOs can be used anywhere a standard digital signature is required today, but are not limited to just how digital signatures are used today. As discussed above, in several embodiments there must be ICTO-awareness as a pre-requisite for use.

One of ordinary skill in the art will recognize that the above use cases are exemplary only, and that many other use cases for the subject matter disclosed herein are possible. For example, because the portable dynamic rule sets include executable code, the ICTO may protect executable content that is only executable upon satisfying the security checks of the ICTO. Also, since the ICTO may execute such content in response to the success or failure of any rule, the ICTO may log successful accesses or take action such as alerting a data owner, initiating a self-destruct sequence, or other actions upon detecting an unauthorized access attempt.

Alternatively there are many other use cases for the subject matter disclosed herein. For example, because an ICTO includes executable code for independent self-management, the ICTO may protect content that is only accessible upon satisfying the security checks and rules of access set forth by the data owner contained within the ICTO. Also, the ICTO, in response to the success or failure of any rule, may log such accesses and/or take action such as alerting a data owner, initiating a self-destruct sequence, or other actions upon detecting an unauthorized access attempt.

Figure 6:
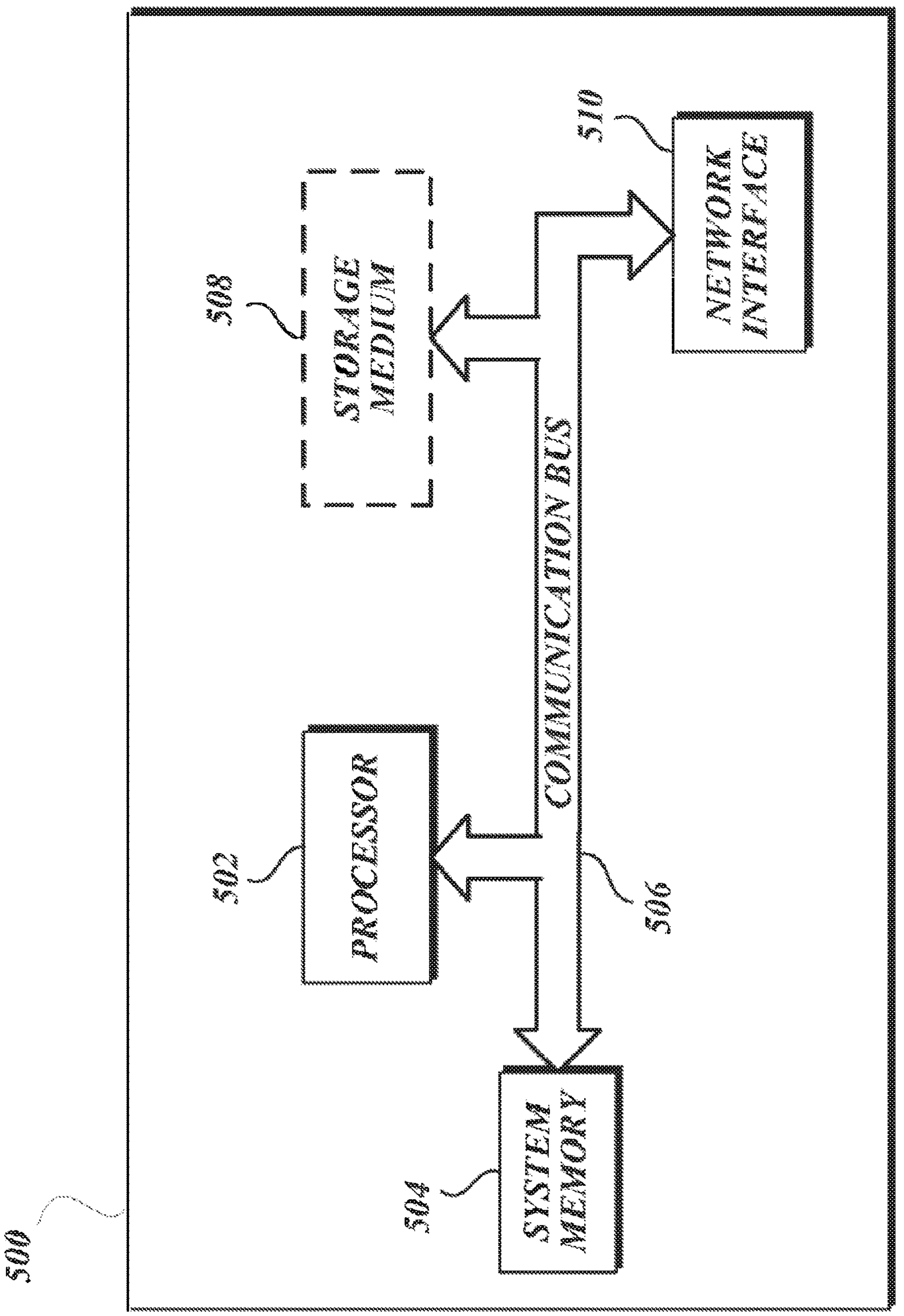
FIG. 6 shows a block diagram that illustrates an exemplary hardware architecture of a computing device suitable for use with embodiments of the present invention.

FIG. 6 is a block diagram that illustrates an exemplary hardware architecture of a computing device 500 suitable for use with embodiments of the present disclosure. Those of ordinary skill in the art and others will recognize that the computing device 500 may be any one of any number of currently available or yet to be developed devices including, but not limited to, desktop computers, server computers, lap top computers, embedded computing devices, application specific integrated circuits (ASICs), smartphones, tablet computers, and/or the like. In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 serves as a computational center of the computing device 500 by supporting the execution of instructions.

As further illustrated in FIG. 6, the computing device 500 may include a network interface 510 comprising one or more components for communicating with other devices over the network. Embodiments of the present dis closure may access basic services that utilize the network interface 510 to perform communications using common net work protocols. In the exemplary embodiment depicted in FIG. 6, the computing device 500 also includes a storage medium 508. However, services may be accessed using a computing device that does not include means for persisting data to a local storage medium. Therefore, the storage medium 508 depicted in FIG. 6 is represented with a dashed line to indicate that the storage medium 508 is optional. In any event, the storage medium 508 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and the like.

As used herein, the term "computer readable media" includes volatile and nonvolatile and removable and nonremovable media implemented in any method or technology capable of storing information, such as computer readable instructions, data structures, program modules, or other data. In this regard, the system memory 504 and storage medium 508 depicted in FIG. 6 are merely examples of computer readable media.

Suitable implementations of computing devices that include a processor 502, system memory 504, communication bus 506, storage medium 508, and network interface 510 are known and commercially available. For ease of illustration and because it is not important for an understanding of the claimed subject matter, FIG. 6 does not show some of the typical components of many computing devices. In this regard, the computing device 500 may include input devices, such as a keyboard, mouse, microphone, touch input device, and/or the like. Similarly, the computing device 500 may also include output devices such as a display, speakers, printer, and/or the like. Since all these devices are well known in the art, they are not described further herein.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A computer-implemented method for transmitting digitally secured data, comprising:

- constructing a computer-based intelligent cipher transfer object (ICTO) using a first computing device, wherein the ICTO is a self-contained data object comprising a portable dynamic rule set;
- wherein constructing the ICTO comprises:
  - determining a cloaking pattern for each participant of the ICTO; and
  - cloaking each participant using the determined cloaking pattern; and
- transmitting the computer-based ICTO to a second computing device.

2. The method of claim 1, wherein the ICTO comprises a set of the digitally secured data.

3. The method of claim 1, further comprising activating, through the second computing device, the ICTO.

4. The method of claim 1, further comprising submitting, by the second computing device, a request to access data of the ICTO.

5. The method of claim 4, further comprising verifying, by the ICTO, an identity of a second user of the second computing device.

6. The method of claim 1, further comprising determining, by the ICTO, at least two different cloaking patterns.

7. The method of claim 1, further comprising de-cloaking, by the ICTO, the one or more cloaking patterns to allow access to the protected data.

8. The method of claim 1, further comprising providing access, by the ICTO, to a user for a given time period.

9. The method of claim 1, further comprising notifying a first user of an access attempt of the ICTO from another user.

10. The method of claim 1, wherein the ICTO includes a first data set and a second data set.

11. A system for transmitting digitally secured data, comprising:

- a first computing device configured to construct a computer-based intelligent cipher transfer object (ICTO), wherein the ICTO is a self-contained data object comprising a portable dynamic rule set, wherein the first computing device is configured to, when constructing the ICTO:
  - determine a cloaking pattern for each participant of the ICTO; and
  - cloak each participant using the determined cloaking pattern; and
- a second computing device, wherein the first computing device is configured to transmit the ICTO to the second computing device.

12. The system of claim 11, wherein the first computing device transmits the ICTO to the second computing device over a trusted service.

13. The system of claim 11, wherein the ICTO comprises a set of digitally secured data.

14. The system of claim 11, wherein a user submits a request to access data of the ICTO through the second computing device.

15. The system of claim 14, wherein the ICTO is programmed to verify an identity of the user.

16. The system of claim 11, wherein the ICTO is programmed to determine at least two different cloaking patterns.

17. The system of claim 11, wherein the ICTO is further programmed to de-cloak the one or more cloaking patterns to allow access to the protected data.

18. The system of claim 11, wherein the ICTO is programmed to provide access to a user for a period of time.

19. The system of claim 11, wherein the ICTO includes a first set of data and a second set of data.

20. The system of claim 19, wherein the ICTO is programmed to allow access to the first set of data while preventing access to the second set of data.

* * * * *